(12) United States Patent
Ueno

(10) Patent No.: US 6,934,100 B2
(45) Date of Patent: Aug. 23, 2005

(54) METHOD OF MEASURING NON-LINEARITY IN MAGNETIC RECORDING/REPRODUCTION, DEVICE FOR MAGNETIC RECORDING/REPRODUCTION AND LSI FOR MAGNETIC RECORDING REPRODUCTION

(75) Inventor: Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 09/997,933

(22) Filed: Nov. 30, 2001

(65) Prior Publication Data

US 2002/0105744 A1 Aug. 8, 2002

(30) Foreign Application Priority Data

Nov. 30, 2000 (JP) ........................................ 2000-365874
Oct. 5, 2001 (JP) ........................................ 2001-310365

(51) Int. Cl.$^7$ ............................................. G11B 27/36
(52) U.S. Cl. .......................... 360/31; 360/45; 360/53; 360/51; 324/210; 324/212
(58) Field of Search .............................. 360/31, 45, 53, 360/66, 51, 46; 324/210, 212, 226

(56) References Cited

U.S. PATENT DOCUMENTS 5,784,296 A * 7/1998 Baker et al. ................. 360/53
6,005,731 A * 12/1999 Foland et al. ............... 360/53
6,414,811 B1 * 7/2002 Lee ............................. 360/66
6,788,481 B2 * 9/2004 Fang et al. ................... 360/31

FOREIGN PATENT DOCUMENTS

JP       10-172105    *  6/1998

OTHER PUBLICATIONS

"A Generalized Frequency Domain Nonlinearity Measurment Method", Xiaodong Che, et al.; *IEEE Transactions on Magnetics*, vol. 30, No. 6; Nov. 1994.
"Non–Linear Interactions in a Series of Transitions",Alexander Taratorin et al.; *IEEE Transactions on Magnetics*, vol. 33, No. 1; Jan. 1997.

* cited by examiner

*Primary Examiner*—David Hudspeth
*Assistant Examiner*—Natalia Figueroa
(74) *Attorney, Agent, or Firm*—Greer, Burns & Crain, LTD

(57) ABSTRACT

Method of accurately measuring various kinds of non-linear transition shifts (NLTSs) in the magnetic recording/reproduction using an MR-type reproducing head is provided.

According to the method, the data of a reference bit-string pattern are sent, as reference signals, to a magnetic disk 2 via a head IC 5 and a magnetic head 3 so as to be magnetically recorded. A first predetermined harmonic component Vnref is measured from the reproduced signals of the record data detected by the magnetic head 3, a bit-string pattern is selected from plural kinds of predetermined bit-string patterns, the data of the selected bit-string pattern are sent, as to-be-measured signals, to the magnetic disk 2, a second predetermined harmonic component Vnpat is measured from the reproduced signals, and the NLTS is calculated from Vnref and Vnpat.

35 Claims, 18 Drawing Sheets

Fig.7A

| KIND OF NLTS MEASUREMENT | | RECORDING PATTERN A (NRZI NOTATION) | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| TO-BE-MEASURED PATTERNS | DIBIT (ORIGINAL) | 1 | 1 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 |
| | TRIBIT (BIPOLAR) | 1 | 1 | 1 | 1 | 0 | 0 | 0 | 1 | 1 | 1 | 0 | 0 | 0 | 1 | 0 | 1 | 1 | 1 | 0 | 0 | 1 | 1 | 1 | 0 | 0 | 0 | 0 | 0 | 0 | 0 | 0 |
| | 2T (BIPOLAR) | 1 | 0 | 1 | 0 | 1 | 0 | 1 | 0 | 1 | 0 | 0 | 0 | 1 | 0 | 0 | 1 | 1 | 1 | 1 | 0 | 0 | 0 | 1 | 1 | 0 | 0 | 0 | 0 | 0 | 0 | 0 |
| | HTS (O/WNLTS) | 1 | 0 | 1 | 0 | 1 | 0 | 0 | 0 | 0 | 0 | 0 | 0 | 0 | 0 | 0 | 0 | 0 | 1 | 0 | 1 | 0 | 0 | 0 | 0 | 0 | 0 | 0 | 0 | 0 | 0 | 0 |
| REFERENCE PATTERN | REF (COMMON) | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Fig.7B

| NLTS | ABSOLUTE ERROR BY ASYM |
|---|---|
| AVERAGE BIPOLAR NLTS VALUE OF DIBIT | -5% |
| AVERAGE BIPOLAR NLTS VALUE OF TRIBIT | +5% |
| AVERAGE BIPOLAR NLTS VALUE OF 2T PATTERN | -5% |
| UNIPOLAR NLTS | LESS THAN 5% |

Fig.8A

| KIND OF NLTS MEASUREMENT | V5pat | V5ref |
|---|---|---|
| DIBIT (ORIGINAL) | $[1+\exp(-j*PI/3*ow)]*[1+\exp(-j*PI/3*2)]$ $-\exp(-j*PI/3*(1-nlts))]$ | |
| TRIBIT (BIPOLAR) | $[1+\exp(-j*PI/3*ow)]*[1+\exp(-j*PI/3*(2-nlts))]$ | |
| 2T (BIPOLAR) | $[1+\exp(-j*PI/3*ow)]*[1+\exp(-j*PI/3*2)]$ $-\exp(-j*PI/3*(2-nlts))]$ | |
| HTS (O/WNLTS) | $[1-\exp(-j*PI/3*ow)]*\exp(-j*PI/3)$ | $[1+\exp(-j*PI/3*ow)]$ |

| (V5pat/V5ref)=Vab | FORMULAS FOR NLTS CALCULATION | |
|---|---|---|
| | STRICT SOLUTION | APPROXIMATE SOLUTION |
| $\|1+\exp(-j*PI/3*nlts)\|$ | $\mathrm{acos}[(2-Vab^2)/2]*3/PI$ | $Vab*3/PI$ |
| $\|1+\exp[-j*PI/3*(2-nlts)]\|$ | $2-\mathrm{acos}[(Vab^2-2)/2]*3/PI$ | — |
| $\|1-\exp[-j*PI/3*(1-nlts)]\|$ | $1-\mathrm{acos}[(2-Vab^2)/2]*3/PI$ | $1-Vab*3/PI$ |
| $\|1-\exp(-j*PI/3*ow)\|/$ $\|1+\exp(-j*PI/3*ow)\|$ | $\mathrm{acos}[(1-Vab^2)/(1+Vab^2)]*3/PI$ | $Vab*6/PI$ |

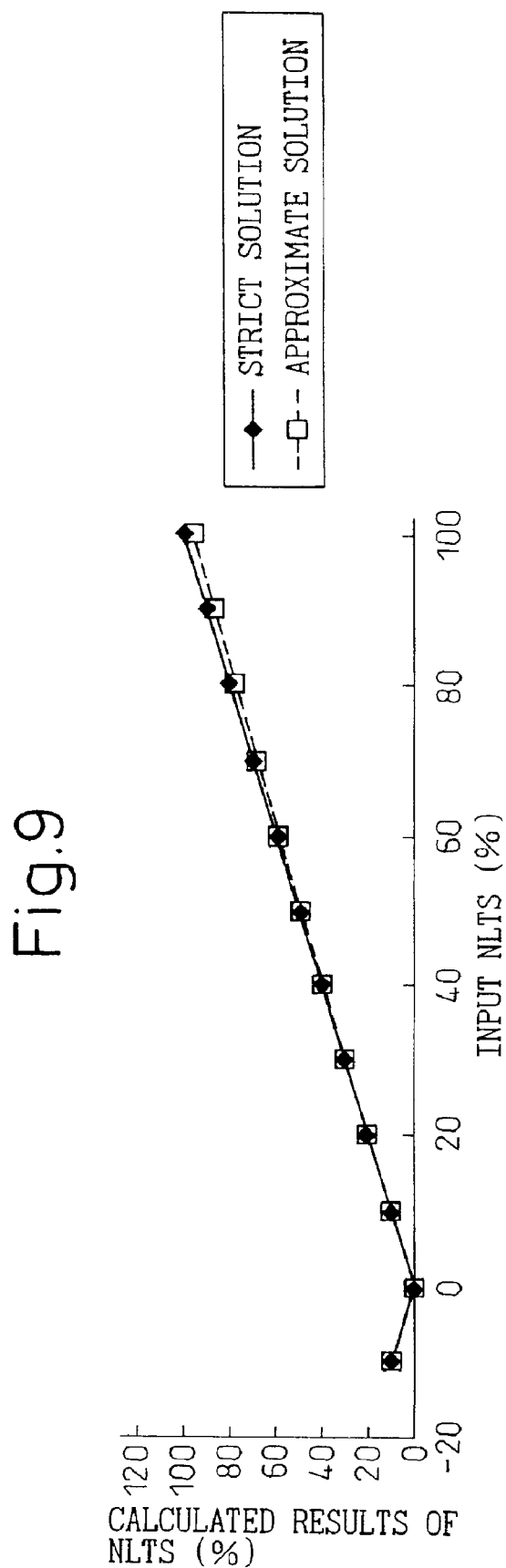

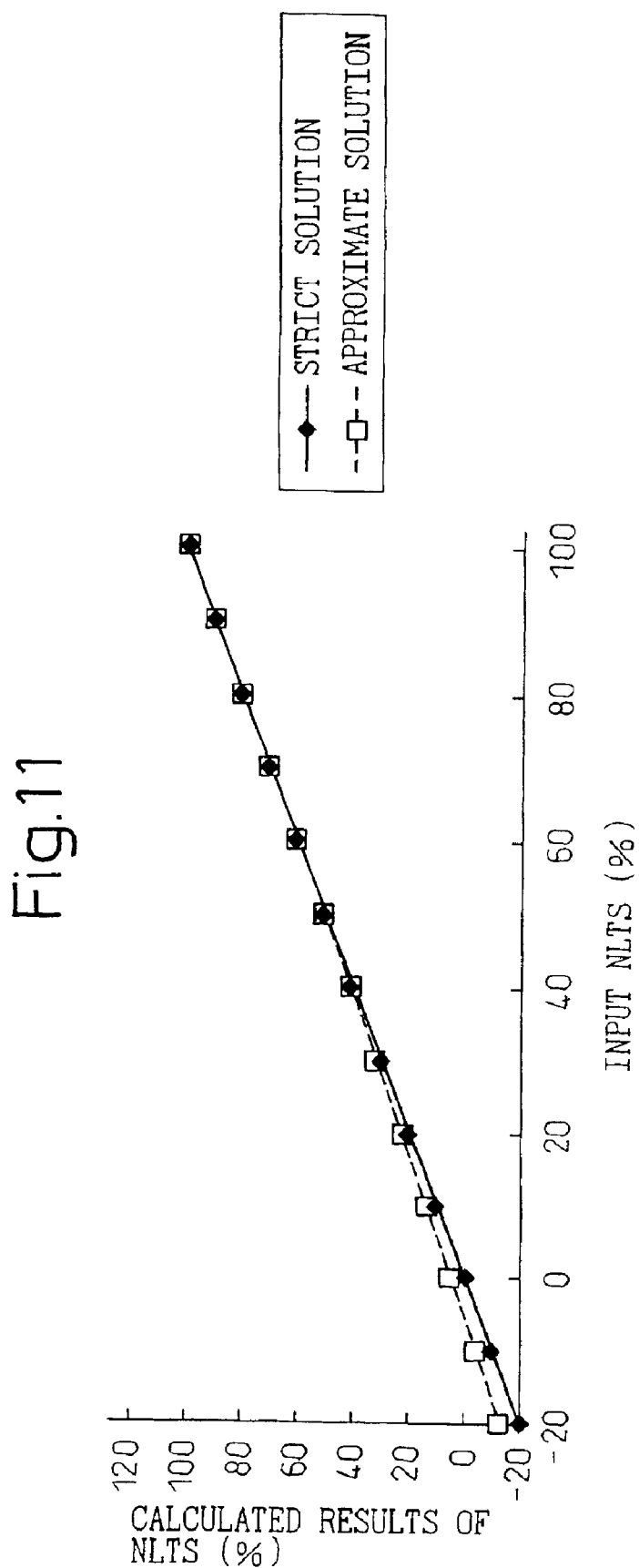

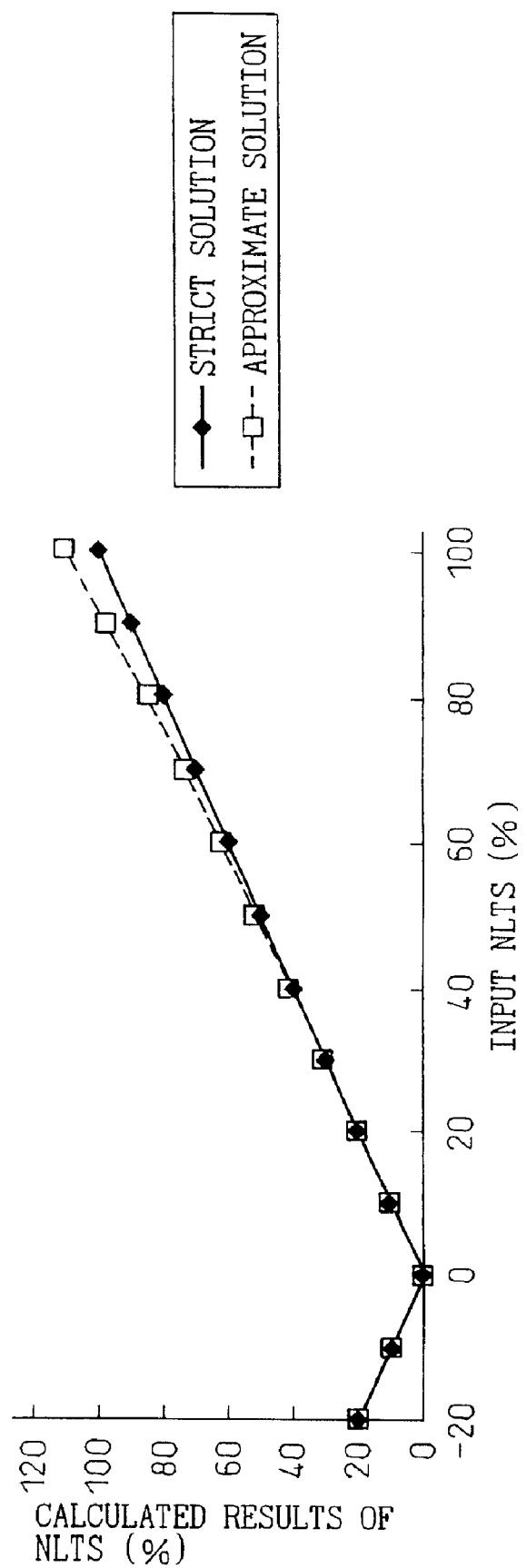

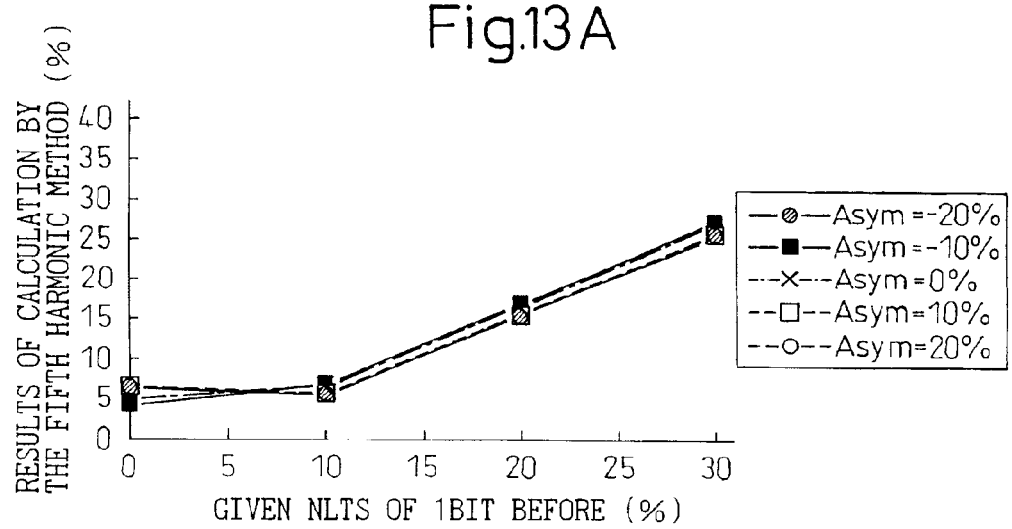
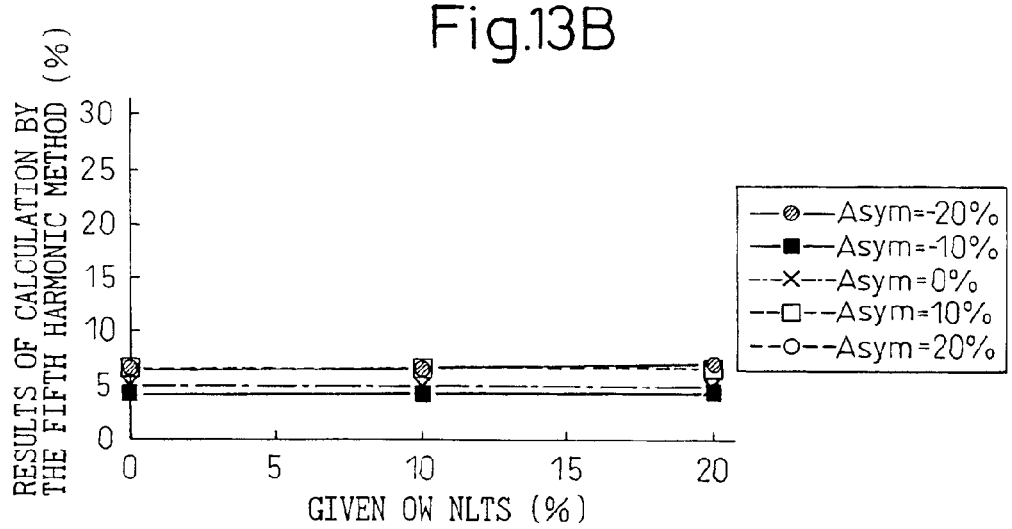

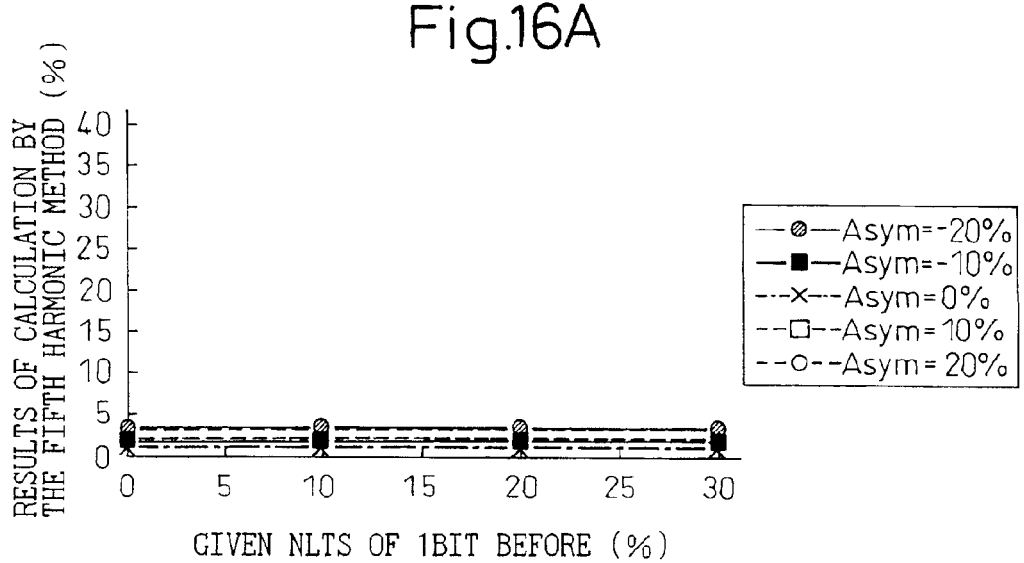
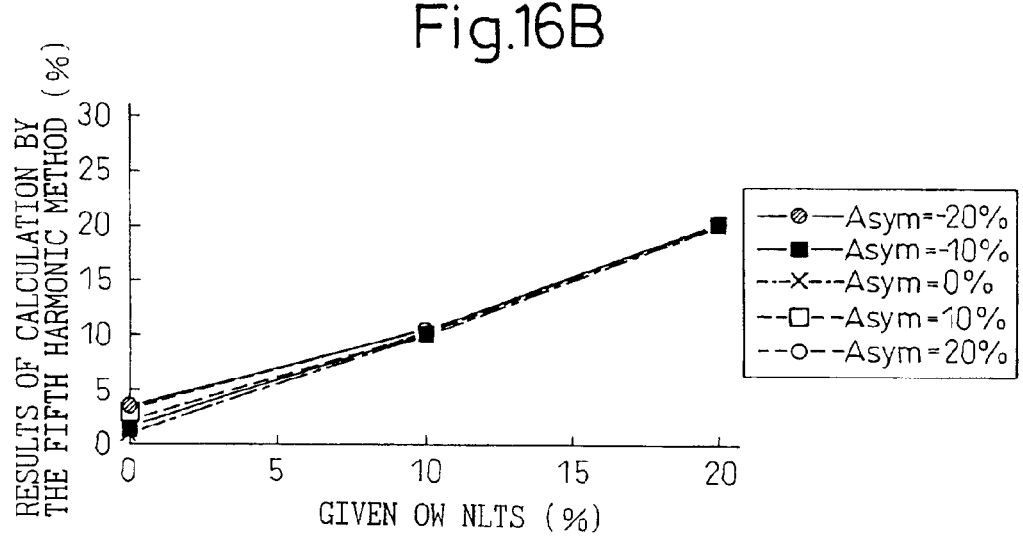

METHOD OF MEASURING NON-LINEARITY IN MAGNETIC RECORDING/REPRODUCTION, DEVICE FOR MAGNETIC RECORDING/REPRODUCTION AND LSI FOR MAGNETIC RECORDING REPRODUCTION

BACKGROUND OF THE INVENTION

1. Field of the Invention

The present invention relates to a method of measuring non-linearity. More particularly, the invention relates to a method of measuring non-linearity in magnetic recording/reproduction by recording/reproducing digital data, as a change in the polarity of magnetization, into or from a recording medium such as magnetic tape, magnetic card, flexible disk, magnetic disk, magneto-optic disk or magnetic drum.

2. Description of the Related Art

Accompanying the trend toward higher densities and higher data transmission speeds of magnetic recording/reproducing devices in recent years, it is becoming essential to measure a non-linear transition shift (NLTS) that occurs in the magnetic head, recording medium and record/reproduction transmission system. The NLTS is a data necessary for magnetically recording data in the recording medium and for correctly reproducing the recorded data by taking the transition shift (TS) into consideration, so that the recorded data will not be affected by the preceding or succeeding recorded data.

A prior method of measuring NLTS has been disclosed in a theory entitled "A Generalized Frequency Domain Non-linearity Measurement Method" by X. Che, M. J. Peek and F. Fitzpartick, IEEE Transactions on Magnetics, Vol. 30, No. 6, p. 4236, 1994. This theory teaches a method of measuring NLTS that occurs when signals of a bit-string pattern, in which the magnetic inversion occurs continuously over two bits (dibit), are magnetically recorded in the medium.

The method of measuring the NLTS will now be described. The method of measuring the NLTS comprises the following three steps.

In a first step, the data are recorded into the medium using reference signals which repeats a bit-string pattern of 30 T with the pulse width of each bit being T and the polarity being inverted every after 15 bits (15 T), and a fifth harmonic component of the reproduced signals (hereinafter referred to as fifth component) is measured. The fifth component is denoted by V5ref. The reference signals are expressed below by the NRZ notation which expresses the codes for recording the data in the medium in terms of the levels and by the NRZI notation which expresses the codes for recording in terms of the inversion of levels.

| Reference signals: | | |
|---|---|---|
| NRZ notation: | 111111111111111 | 000000000000000 |
| NRZI notation: | 100000000000000 | 100000000000000 |

In a second step, the data are recorded into the medium by using the to-be-measured signals which repeat a bit-string pattern of 30 T including a Dibit pattern, and a fifth component V5pat of the reproduced signals is measured. The to-be-measured signals are expressed below by the NRZ notation and by the NRZI notation.

| To-be-measured signals: | | |
|---|---|---|
| NRZ notation: | 100000001111111 | 011111110000000 |
| NRZI notation: | 110000001000000 | 110000001000000 |

In a step 3, a ratio Vab=V5pat/V5ref is calculated from the fifth component V5ref and from the fifth component V5pat measured in the steps 1 and 2. Then, the NLTS (Dibit) occurring with the Dibit is calculated from the following formula (1). Here, NLTS is a value normalized with 1T, i.e., a value of when the pulse width of 1T is set to be 1 (100%).

$$NLTS(\text{Dibit}) = a \cos\left[(2-Vab^2)/2\right]*3/\pi \tag{1}$$

The above formula (1) can be approximated by the following formula (2), $$NLTS(\text{Dibit}) = Vab*3/\pi \tag{2}$$

The above theory further describes a method of measuring the NLTS of when the inversion of magnetization further continues. In addition to the above theory written by J. Fitzpatrick, the theory by A. Taratorin, S. X. Wang, B. Wilson entitled "Non-Linear Interactions in a Series of Transitions", IEEE Transactions on Magnetics, Vol. 33, No. 1, p. 956–961, January, 1996, describes that when a reproduction head of the MR (magnetic reluctance) type is used, measurement of NLTS involves a large error unless non-linearity of the reproduction head is removed.

As one of the NLTSs, further, there can be exemplified a transition shift by the recorded data (HTS: hard transition shift or O/W (overwrite) NLTS) and as the measuring method thereof, there has been known a method that calculates the NLTS from the reference signals (f) repeating a single bit-string pattern and from the to-be-measured signals (f/2) having a frequency one-half thereof. According to this method, it is necessary to overwrite a to-be-measured signal (f/2) on the medium synchronized with a reference signal which is previously recorded on the medium, which requires a long time. Therefore HTS (=NLTS) often differs when the frequency of the reference signals is changed and it is obliged to change the measuring method unlike the above-mentioned method of measuring the NLTS relying upon the fifth harmonic component. In other words, the measuring method loses compatibility.

In the past, it was sufficient to determine the performance of a device for magnetic recording/reproduction by only measuring the NLTS that occurs when a dibit bit-string signal is magnetically recorded in a medium. However, recently, accompanying the trend toward higher densities and higher data transmission speeds of magnetic recording/reproduction devices, it has been required to measure the NLTS that occurs when a tribit bit-string signal or a 2T bit-string signal other than the dibit bit-string pattern is magnetically recorded repeatedly in a medium.

So far, further, the reference signals and the signals to be measured have been given by a host equipment, and the NLTS has been calculated by the host equipment. Therefore, the host equipment side requires a special function, and it is difficult to calculate the NLTS again after shipment.

In view of the above-mentioned problems, therefore, it is an object of the present invention to easily measure the various kinds of NLTS without taking a long time while decreasing error in measuring the non-linearity caused not only by the electromagnetic induction-type reproducing head but also by the MR (magnetic reluctance)-type reproducing head or imparting compatibility to the method of measuring NLTS, i.e., without changing the measuring method in measuring the non-linearity in the magnetic recording/reproduction.

Another object of the present invention is to measure the NLTS by using a magnetic recording/reproduction device alone.

SUMMARY OF THE INVENTION

In order to accomplish the above object, the present invention provides a method of measuring non-linearity in an object which receives input signals and produces output signals in response to the input signals, comprising the steps of:

feeding signals of a reference pattern to said object to measure a first predetermined harmonic component from the output signals thereof;

selecting signals of a pattern from signals of plural kinds of predetermined patterns;

feeding signals of said selected pattern to said object cyclically to measure a second predetermined harmonic component from the output signals thereof; and calculating a non-linear transition shift NLTS in said object from said first predetermined harmonic component and from said second predetermined harmonic component.

The present invention further provides a method of measuring non-linearity in the magnetic recording/reproduction of a medium comprising the steps of:

measuring a first predetermined harmonic component from the reproduced signals of the reference signals magnetically recorded in a medium;

measuring a second predetermined harmonic component from the reproduced signals for each of the plural kinds of to-be-measured signals magnetically recorded in said medium; and calculating a non-linear transition shift NLTS in the magnetic recording/reproduction from said first predetermined harmonic component and from said second predetermined harmonic component corresponding to each of the to-be-measured signals.

In the above method, said predetermined harmonic component is a fifth harmonic component.

In the above method, said reference signals are the ones obtained by cyclically and serially shifting, from an optional bit, the data of a bit-string pattern for magnetically recording the data into said medium by once effecting the magnetization and demagnetization for the same period of time, respectively; and wherein said plural kinds of predetermined bit-string patterns include:

a first pattern of bit strings each including a tribit in which the magnetic inversion occurs continuously for three bits in each period of said magnetization and demagnetization;

a second pattern of bit strings each including 2T in which the magnetic inversion occurs after an interval of two bits in each period of said magnetization and demagnetization; and a third pattern of bit strings including a bit constitution HTS in which the magnetic inversion occurs in a manner that the magnetization occurs in a direction opposite to the direction of magnetization of the record in the medium.

In the above method, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

In the above method, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is the one of a 30-bit string of 101000001000000 101000001000000 in which the magnetic inversion occurs at the 0th, 2nd, 8th, 15th and 17th bits and at the 23rd bit.

In the above method, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

In the above method, said NLTS is measured within an error range of 5%.

In order to accomplish the above object according to a first aspect of the invention, there is provided an LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there is incorporated a circuit for generating a bit-string pattern in common with said plural kinds of bit-string patterns and plural kinds of predetermined bit-string patterns forming said to-be-measured signals.

In order to accomplish the above object, according to a second aspect of the invention, there is provided an LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there is incorporated a circuit for measuring a predetermined harmonic component from said reference signals and from the reproduced signals of plural to-be-measured signals corresponding to one of said reference signals.

In order to accomplish the above object, according to a third aspect of the invention, there is provided an LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there are incorporated a circuit for generating a bit-string pattern forming said reference signals and a predetermined bit-string pattern forming said to-be-measured signals, and a circuit for measuring a predetermined harmonic component from said reference signals recorded in said medium and from the reproduced signals said to-be-measured signals.

In the LSI according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

In the LSI according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

In the LSI according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

In the LSI according to the first aspect of the invention, said LSI for magnetic recording/reproduction includes a circuit for measuring the fifth harmonic component from the reproduced signals of the data read from said medium in which the data have been stored using said reference signals or said to-be-measured signals.

In the LSI according to the first aspect of the invention, said LSI for magnetic recording/reproduction includes a circuit for calculating a ratio Vab (=V5pat/V5ref) of a second fifth harmonic component V5pat which is a reproduced signal of the data read from said medium in which the data have been recorded using said to-be-measured signals to a first fifth harmonic component V5ref which is a reproduced signal of the data from said medium in which the data have been recorded by using said reference signals.

In the LSI according to the first aspect of the invention, said LSI for magnetic recording/reproduction includes a circuit for calculating a non-linear transition shift NLTS in the magnetic recording/reproduction based upon said ratio Vab (=V5pat/V5ref) calculated from said first fifth harmonic component V5ref and said second fifth harmonic component V5pat.

In the LSI according to the first aspect of the invention, said circuit for measuring the fifth harmonic component includes a high-speed Fourier transform circuit.

In the LSI according to the first aspect of the invention, said LSI for magnetic recording/reproduction includes a circuit for adjusting a write compensation circuit based upon said fifth harmonic component.

In order to accomplish the above object, the present invention provides a device for magnetic recording/reproduction mounting an LSI for magnetic recording/reproduction of any one of the above LSIs.

In order to accomplish the above object, according to the first aspect of the invention, there is provided a device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for selecting data of a bit-string pattern from the data of a bit-string pattern in common with said plural kinds of bit-string patterns and of plural kinds of predetermined bit-string patterns forming said to-be-measured signals, and means for generating said reference signals or said to-be-measured signals by cyclically and serially shifting the data of said selected bit-string pattern starting from any bit.

In order to accomplish the above object, according to the second aspect of the invention, there is provided a device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there is provided means for measuring a predetermined harmonic component from said reference signals and from a reproduced signal of a to-be-measured signal corresponding to one of said reference signals.

In order to accomplish the above object, according to the third aspect of the invention, there is provided a device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for generating said reference signals or said to-be-measured signals by selecting data of a bit-string pattern from the data of the bit-string pattern forming said reference signals and of a predetermined bit-string pattern forming said to-be-measured signals, and cyclically and serially shifting the data of said selected bit-string pattern starting from any bit, and means for measuring a predetermined harmonic component from the reproduced signals of the data read from said medium in which the data have been recorded by using said reference signals and said to-be-measured signals recorded in said medium.

In the device according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

In the device according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

In the device according to the first and the third aspects of the invention, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is the one of a 30-bit string of 101010101000101 010101000000000 in which the magnetic inversion occurs at the 0th, 2nd, 4th, 6th, 8th, 12th, 14th, 16th and 18th bits and at the 20th bit.

In the device according to the first aspect of the invention, said LSI for magnetic recording/reproduction includes a circuit for measuring the fifth harmonic component from the reproduced signals of the data read from said medium in which the data have been stored using said reference signals or said to-be-measured signals.

In the device according to the first aspect of the invention, said LSI for magnetic recording/reproduction includes a circuit for calculating a ratio Vab (=V5pat/V5ref) of a second fifth harmonic component V5pat which is a reproduced signal of the data read from said medium in which the data have been recorded using said to-be-measured signals to a first fifth harmonic component V5ref which is a reproduced signal of the data from said medium in which the data have been recorded by using said reference signals.

In the device according to the first aspect of the invention, said LSI for magnetic recording/reproduction includes a circuit for calculating a non-linear transition shift NLTS in the magnetic recording/reproduction based upon said ratio Vab (=V5pat/V5ref) calculated from said first fifth harmonic component V5ref and said second fifth harmonic component V5pat.

In the device according to the first aspect of the invention, said means for measuring the fifth harmonic component includes a Fast Fourier Transform unit.

In the device according to the first, second, and third aspects of the invention, said device for magnetic recording/reproduction includes means for adjusting a write compensation circuit based upon said fifth harmonic component.

In the device according to the first, second, and third aspects of the invention, said device for magnetic recording/reproduction includes a magnetic reluctance-type head for detecting said reproduced signals.

In the device according to the first, second, and third aspects of the invention, said NLTS is measured within an error range of 5%.

BRIEF DESCRIPTION OF THE DRAWINGS

FIG. 7A is a half part a table listing various recording patterns of the reference signals and of the to-be-measured signals used for the measurement of NLTSs by the fifth harmonic method.

FIG. 7B is another half part of a table listing various recording patterns of the reference signals and of the to-be-measured signals used for the measurement of NLTSs by the fifth harmonic method.

FIG. 8A is a table listing formulas for calculating the NLTSs by the fifth harmonic method shown in FIG. 5.

FIG. 8B is another half part of a table listing formulas for calculating the NLTSs by the fifth harmonic method shown in FIGS. 5A and 5B.

FIG. 9 is a diagram illustrating the results of calculating the NLTSs in simulating various NLTSs in a linear reproducing transmission line by using a Dibit pattern as the to-be-measured signals according to a prior art.

FIG. 11 is a diagram illustrating the results of calculating the NLTSs in simulating various NLTSs in a linear reproducing transmission line by using a 2T pattern as the to-be-measured signals according to the present invention.

FIG. 12 is a diagram illustrating the results of calculating the NLTSs in simulating various NLTSs in a linear reproducing transmission line by using an HTS (O/W NLTS) as the to-be-measured signals according to the present invention.

FIG. 13A is a diagram illustrating the results of measuring the NLTSs by the fifth harmonic method while changing the NLTS by the record data of one bit before from 0% to 30%.

FIG. 13B is a diagram illustrating the results of measuring the NLTSs by the fifth harmonic method while fixing the NLTS by the record data of one bit before to 0% in FIG. 13A.

FIG. 16A is a diagram illustrating the results of measuring the NLTSs by the fifth harmonic method while changing the NLTS by the record data of one bit before from 0% to 30%.

FIG. 16B is a diagram illustrating the results of measuring the NLTSs by the fifth harmonic method while fixing the NLTS by the record data of one bit before to 0% in FIG. 16A.

DESCRIPTION OF THE PREFERRED EMBODIMENTS

Embodiments of the invention will now be described in detail with reference to the accompanying drawings.

Figure 1:
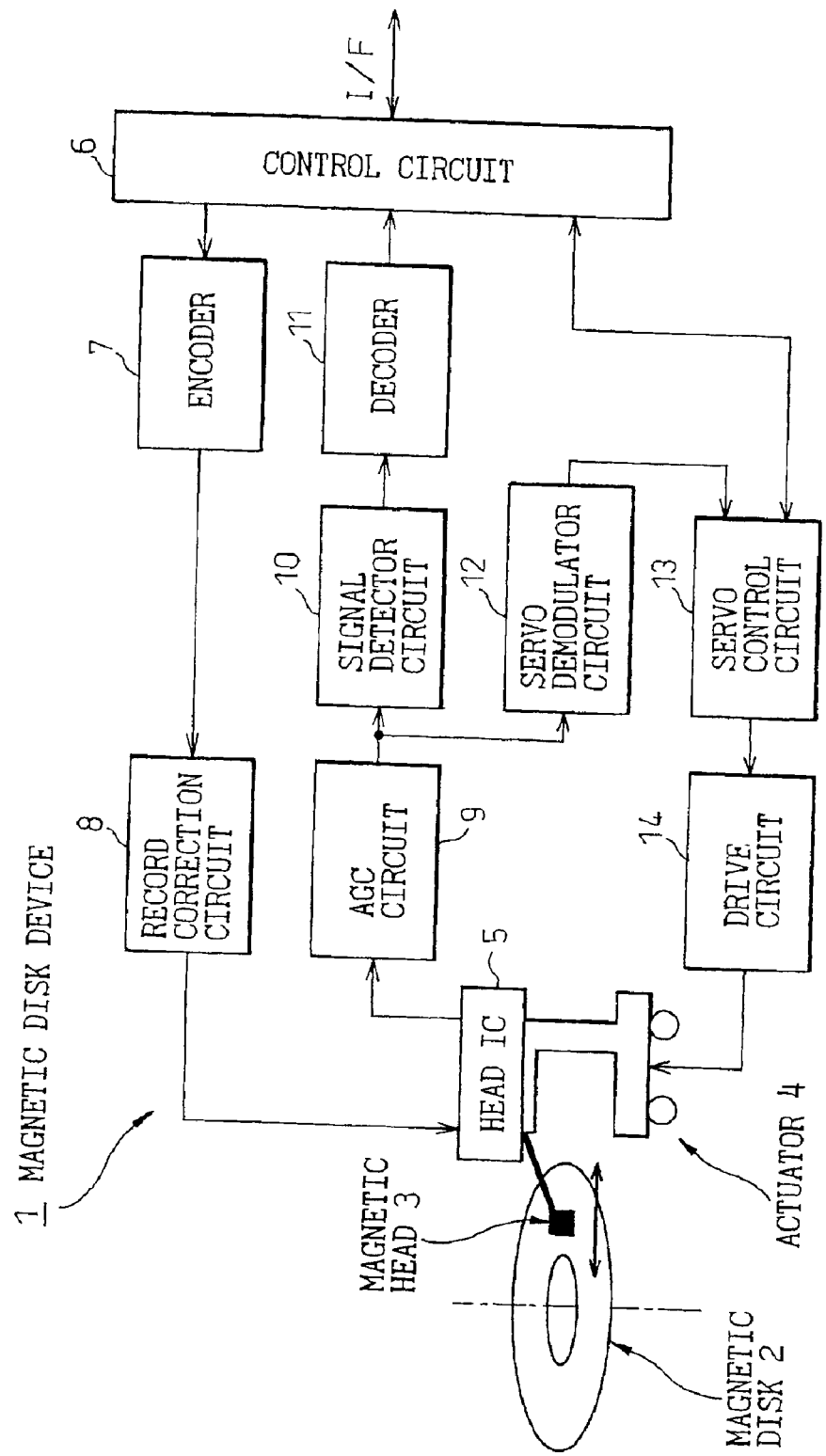
FIG. 1 is a block diagram illustrating the constitution of a first embodiment of a magnetic disk device according to the present invention.

FIG. 1 is a block diagram illustrating the constitution of a magnetic disk device according to an embodiment of the present invention. In a magnetic disk device 1, a magnetic disk 2 having a track formed on a disk-like medium of a magnetic film of a high coercive force is maintained rotated, a recording current is supplied to a magnetic head 3 which is disposed being opposed to the magnetic disk 2 to generate a magnetic field from the magnetic head 3, and the magnetic disk 2 is magnetized in a direction of travel of the track to thereby record data in the magnetic disk 2. At this moment, the magnetic head 3 moves in the radial direction of the magnetic disk 2 due to an actuator 4, and records the data into the track of the magnetic disk 2 formed in a concentric manner. The magnetic head 3 is further supplied with a recording current from a head IC 5 and generates a magnetic field corresponding to the record data.

The record data are, first, fed to a control circuit 6 from an external unit. The record data used for measuring the NLTS include a reference pattern Ref as reference signals, a to-be-measured pattern Dibit ( - - - 00110000 - - - ) as to-be-measured signals, Tribit ( - - - 00111000 - - - ), 2T ( - - - 00101000 - - - ) and THS ( - - - 1010 - - - ). Here, NLTS will be briefly described.

Figure 2:
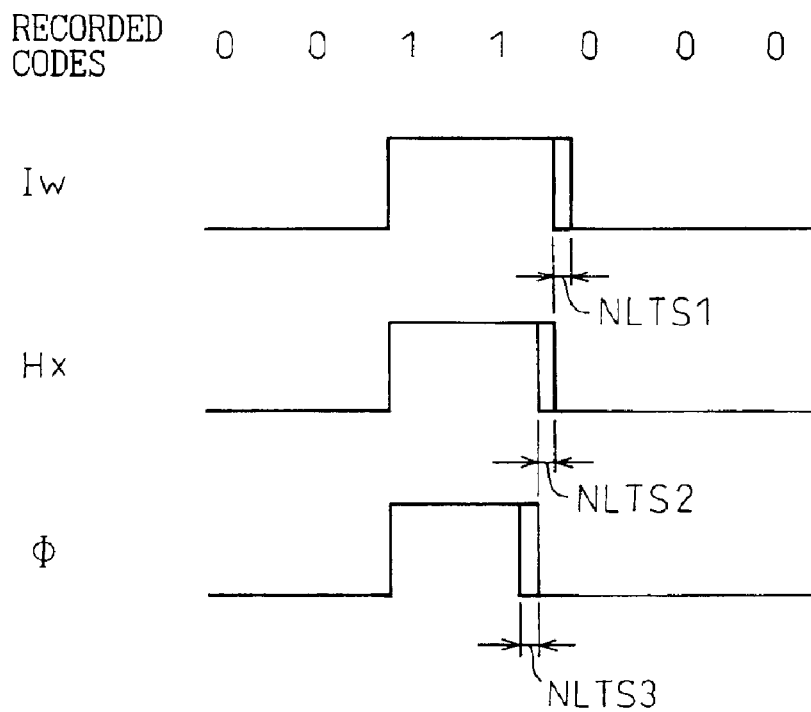
FIG. 2 is a diagram illustrating NLTSs that occur at the time of magnetic recording.

FIG. 2 is a diagram illustrating an NLTS that occurs at the time of magnetic recording, wherein the abscissa represents the position on the track of the magnetic disk. FIG. 2 illustrates a state where the data are recorded from the left toward the right as viewed from the front surface of the paper. In FIG. 2, the upper stage shows codes for recording data, and second and subsequent stages show a recording current Iw of the magnetic head, a magnetic field Hx and a magnetic flux φ of the medium in this order. Referring to FIG. 2, NLTS1 occurs for the recording current Iw, NLTS2 occurs for the magnetic field Hx and NLTS3 occurs for the magnetic flux φ of the medium. Therefore, a total NLTS (=NLTS1+NLTS2+NLTS3) becomes great, and a reading error may occur at the time of reproducing the recorded data.

Reverting to FIG. 1 again, the control circuit 6 receives the above-mentioned record data from an external unit and feeds them to an encoder 7. The encoder 7 converts the record data fed from the control circuit 6 into data of NRZ (non-return to zero) and outputs them so as to be recorded into the magnetic disk 2. The output signals of the encoder 7 are fed to a record correction circuit 8. NRZ is the one called non-return to zero recording system which effects the recording in a pulse waveform in which the length of a gap between the unit codes becomes equal to the length of the pulse in a binary pulse string.

The record correction circuit 8 detects the arrangement of bits of record signals output from the encoder 7, and effects the correction depending upon the bit arrangement. The record signals corrected by the record correction circuit 8 are fed to the head IC 5. The head IC 5 feeds, to the magnetic head 3, a recording current corresponding to the record data fed from the record correction circuit 8.

On the other hand, the signals reproduced by the magnetic head 3 are fed to the head IC 5 and are amplified and are, then, fed to an AGC (automatic gain control) circuit 9. The AGC circuit 9 makes the amplitude of the signals fed from the head IC 5 constant and outputs them.

Signals output from the AGC circuit 9 are fed to a signal detector circuit 10 where the reproduced data are detected. The reproduced data detected by the signal detector circuit 10 are fed to a decoder 11 where they are decoded and are, then, fed to the control circuit 6. The control circuit 6 outputs the reproduced data to an external unit. Signals output from the AGC circuit 9 are fed to a servo demodulator circuit 12. The servo demodulator circuit 12 demodulates servo signals from the signals fed from the AGC circuit 9 and feeds them to a servo control circuit 13. In response to a servo signal fed from the servo demodulator circuit 12 and a control signal fed from the control circuit 6, the servo control circuit 13 forms a drive control signal that meets a difference between the present position of the magnetic head 5 and the position at where the recording or reproduction is to be executed, and feeds it to a drive circuit 14.

In response to the drive control signal fed from the servo control circuit 13, the drive circuit 14 forms a drive signal and feeds it to the actuator 4 to drive it. The actuator 4 is driven by the drive signal from the drive circuit 14 and moves the magnetic head 5 to a predetermined position. When the data are to be recorded into the magnetic disk 2 using the above magnetic disk device 1, the magnetic disk 2 must be magnetized. Being affected by the inversion of magnetization of the data recorded into the recording medium, however, the position of the recorded data is deviated; i.e., the position is deviated from the initial position of magnetic inversion.

Figure 3:
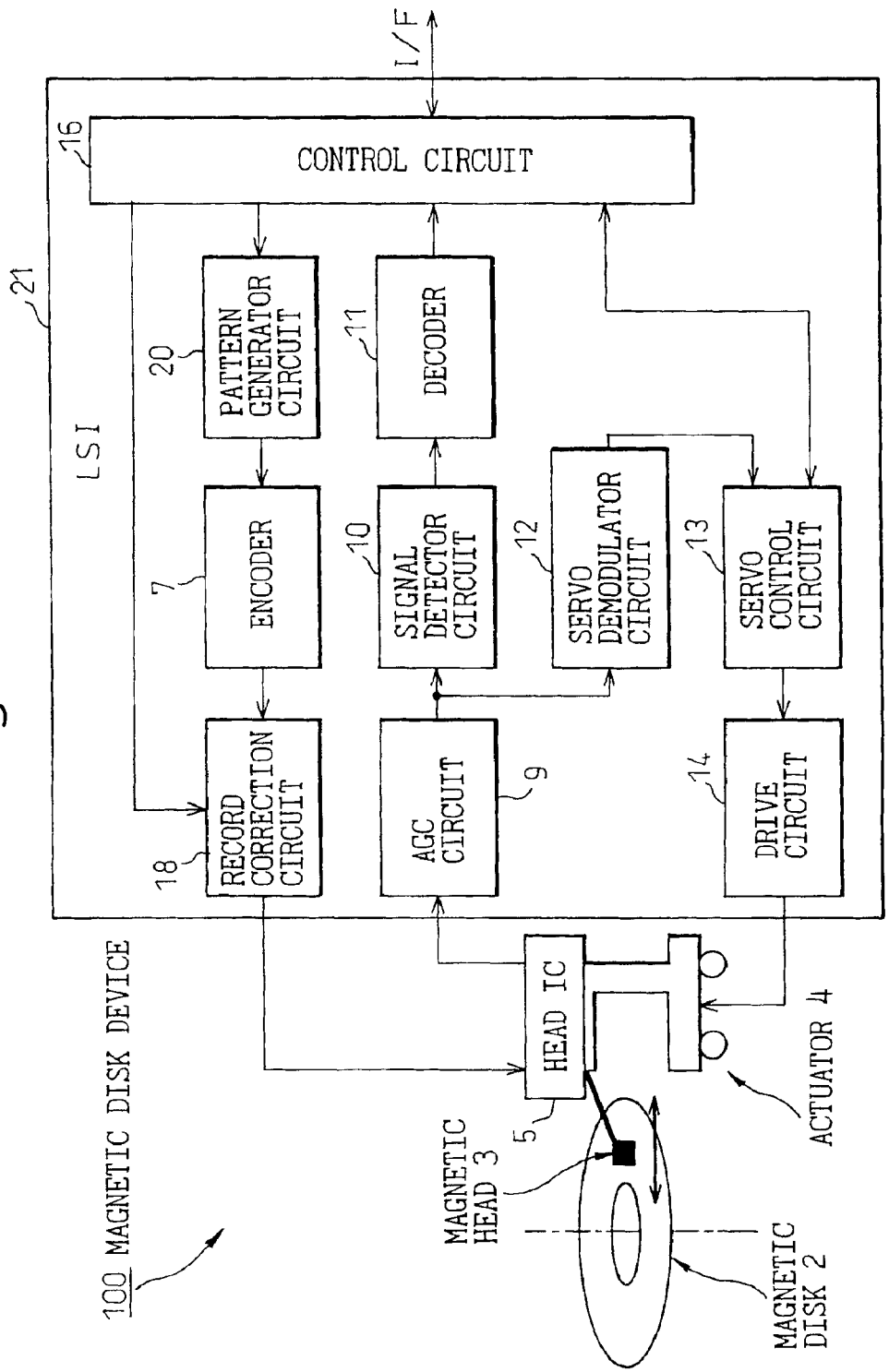
FIG. 3 is a block diagram illustrating the constitution of a second embodiment of the magnetic disk device according to the present invention.

FIG. 3 is a block diagram illustrating the constitution of the magnetic disk device according to a second embodiment of the present invention. The magnetic disk device 100 shown in FIG. 3 is constituted by an LSI 21 in which the control circuit 16 and the record correction circuit 18 in the magnetic disk device 1 of FIG. 1 is constituted as described below, and a pattern generator circuit 20 is provided between the control circuit 16 and the encoder 7.

The control circuit 16 operates as described below. That is, the control circuit 16 receives, from an external unit, a command for selecting the record data of a bit-string pattern that forms reference signals or to-be-measured signals fed to the encoder 7, and feeds them to the pattern generator circuit 20. The control circuit 16 further feeds the calculated result of NLTS by the fifth harmonic method that will be described later to the record correction circuit 18. In response to the calculated result of NLTS that is fed, the record correction circuit 18 feeds the compensated record signal to the head IC 5.

Figure 4:
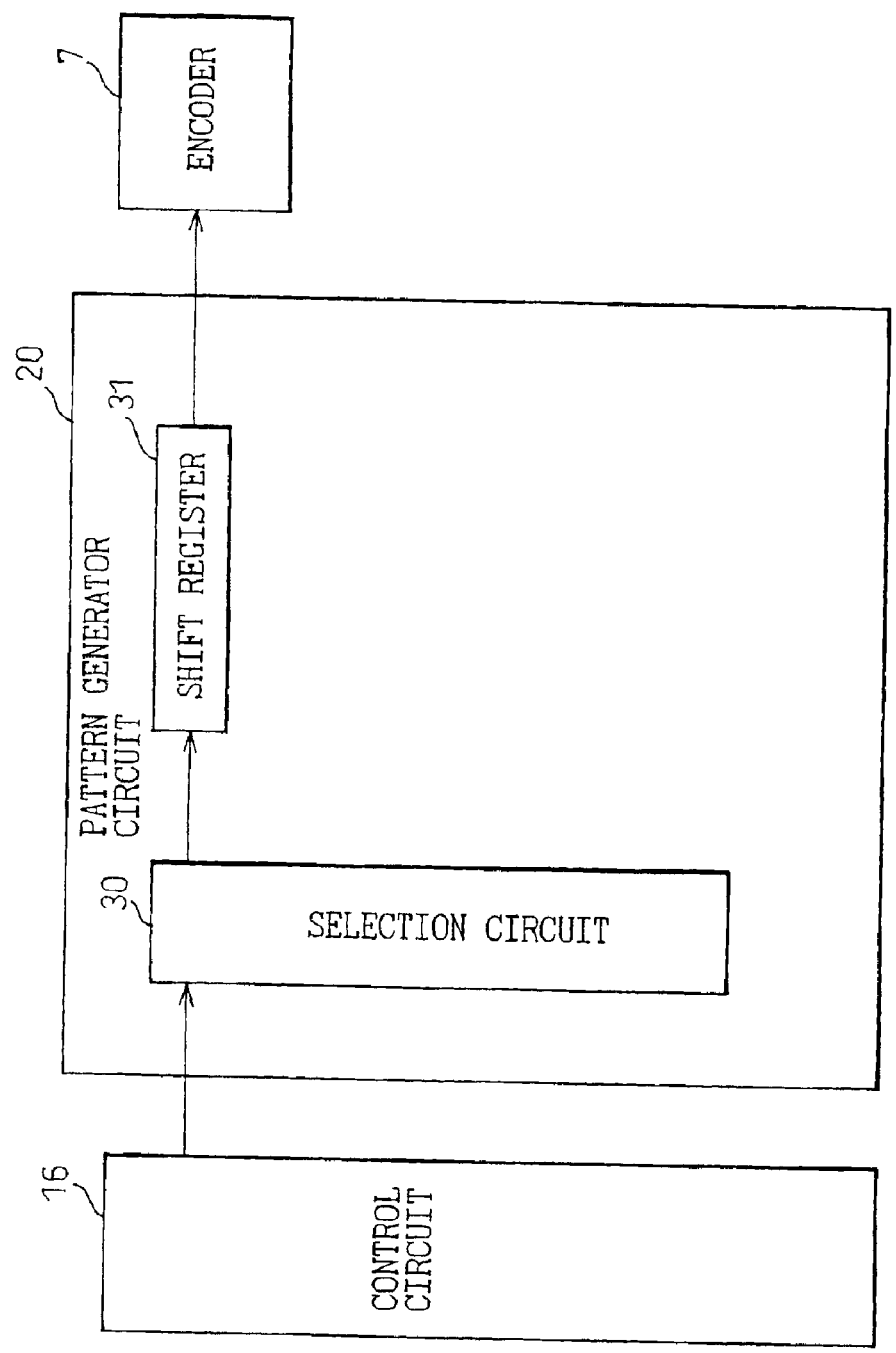
FIG. 4 is a block diagram illustrating the constitution of a pattern-generating circuit used for the magnetic disk device of FIG. 3.

FIG. 4 is a block diagram illustrating the constitution of an embodiment of the pattern generator circuit used for the magnetic disk device of FIG. 3. In response to a command from the control circuit 16, the pattern generator circuit 20 selects a record data out of a reference pattern Ref ( - - - 11110000 - - - ) of reference signals, a to-be-measured pattern Dibit ( - - - 00110000 - - - ) of to-be-measured signals, a Tribit ( - - - 00111000 - - - ), a 2T ( - - - 00101000 - - - ) and an HTS ( - - - 1010 - - - ) each consisting of 30 bits and being stored in advance in a nonvolatile memory (not shown) in a selection circuit 30, and feeds the record data of 30 bits to a shift register 31. The shift register 31 is a 30-bit parallel-input series-output shift register which writes parallel record data of 30 bits when the S/L mode is 0, and cyclically and serially shifts the written data bit by bit from an optional bit when the S/L mode is 1 and feeds it to the encoder 7. Thus, the record data of 30 bits is fed to the encoder 7.

As a further embodiment of the magnetic disk device of the present invention, it is also possible to provide a high-speed Fourier transform unit (FFT; not shown) between the AGC circuit 9 and the signal detector circuit 10 in the LSI 21, in order to detect a fifth harmonic component from the reproduced signal output from the AGC control circuit 9 and to output the fifth harmonic component to an external unit through the control circuit 16.

Next, described below is a basic form of measuring the NLTS by the fifth harmonic method. In the following description, reference is made to the magnetic disk device according to the first embodiment. The method of measuring the NLTS comprises the following three steps.

In a first step, reference signals which repeat a bit-string pattern of 30 T with the pulse width of each bit being T and the polarity being inverted every after 15 bits (15 T) are sent to the control circuit 6 from the external unit, the data are recorded into the magnetic disk 2, the reproduced signals thereof are detected from the outputs of the AGC circuit 9, and a fifth harmonic component (hereinafter referred to as a fifth component) is measured by using a spectrum analyzer or an FFC. The fifth component is denoted by V5ref. The reference signals are expressed below by the NRZ notation which expresses the codes for recording the data in the magnetic disk 2 in terms of the levels and by the NRZI notation which expresses the codes for recording in terms of the inversion of levels.

| Reference signals: | | |
|---|---|---|
| NRZ notation: | 111111111111111 | 000000000000000 |
| NRZI notation: | 100000000000000 | 100000000000000 |

In a second step, the data are recorded into the magnetic disk 2 by using the to-be-measured signals which repeat a bit-string pattern of 30 T including a Dibit pattern, and a fifth component V5pat of the reproduced signals is measured by using the spectrum analyzer or the FFC. The to-be-measured signals are expressed below by the NRZ notation and by the NRZI notation.

| To-be-measured signals: | | |
|---|---|---|
| NRZ notation: | 100000001111111 | 011111110000000 |
| NRZI notation: | 110000001000000 | 110000001000000 |

In a step 3, a ratio Vab=V5pat/V5ref is calculated from the fifth component V5ref and from the fifth component V5pat measured in the steps 1 and 2. Then, the NLTS (Dibit) occurring with the Dibit is calculated from the following formula (1). Here, NLTS is a value normalized with 1T, i.e., a value of when the pulse width of 1 T is set to be 1 (100%).

$$NLTS(Dibit)=a\cos[(2-Vab^2)/2]*3/\pi \quad (1)$$

The above formula (1) can be approximated by the following formula (2), $$NLTS(Dibit)=Vab*3/\pi \quad (2)$$

Next, described below is the measurement of the NLTS based on the fifth harmonic method by using various to-be-measured patterns. Here, a reference pattern is used in common, various to-be-measured patterns are provided, and the fifth harmonic wave is measured. As for selecting the to-be-measured patterns, there is used a reproduced signal in which the non-linearity of the MR head is modeled, and a pattern durable against non-linearity of MR is selected.

Figure 5:
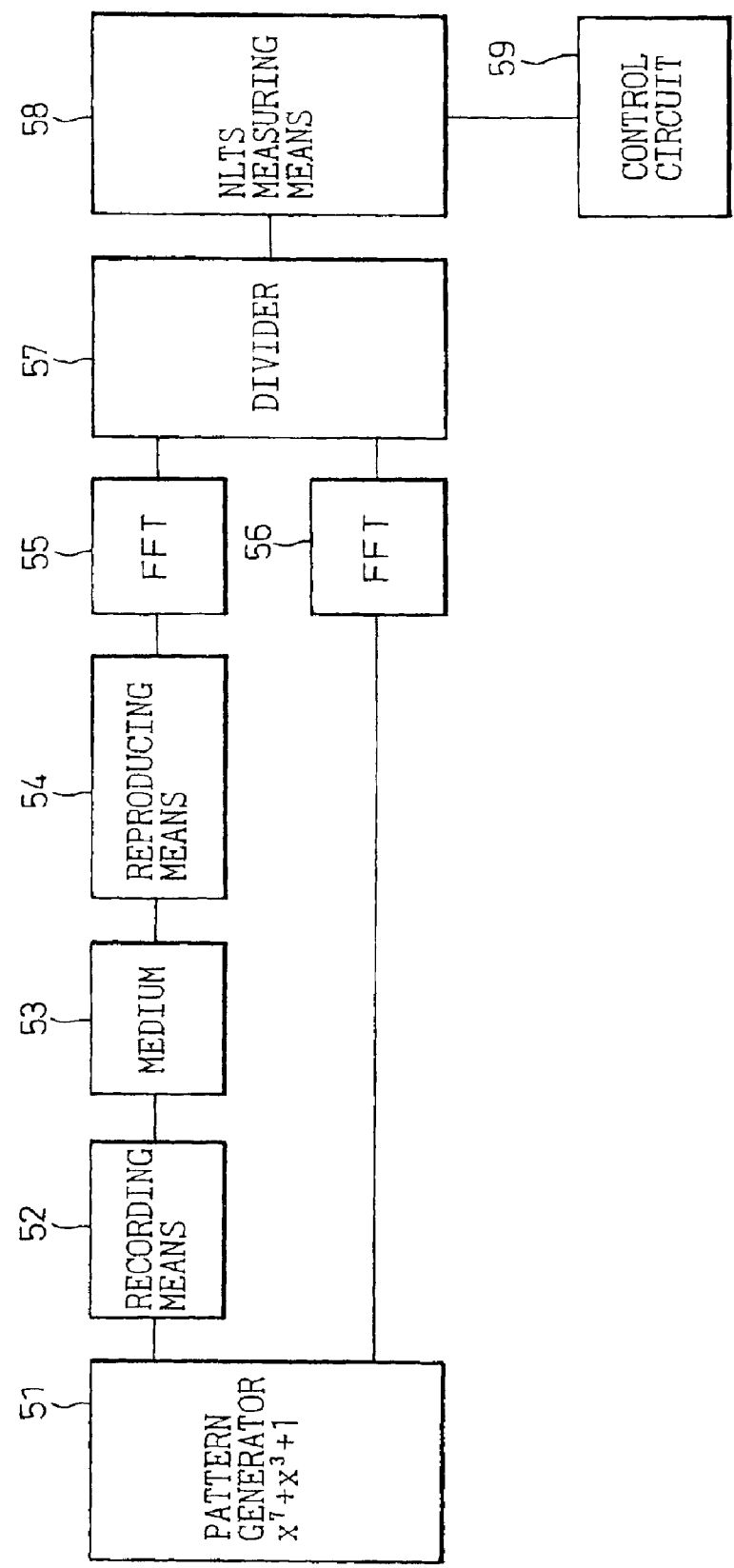
FIG. 5 is a block diagram illustrating of the device for magnetic/reproduction for measuring the non-linearity of a medium in the magnetic recording/reproduction.

FIG. 5 is a block diagram illustrating of the device for magnetic recording/reproduction for measuring the non-linearity of a medium in the magnetic recording/reproduction according to the present invention. A reference signal or a signal to be measured is recorded into a medium 53 from a pattern generator 51 through recording means 52. The data recorded in the medium 53 is input to a first high-speed Fourier transform unit FFT 55 through reproducing means 54. Further, the reference signal or the signal to be measured is input to a second high-speed Fourier transform unit FFT 56 from the pattern generator 51.

Figure 6:
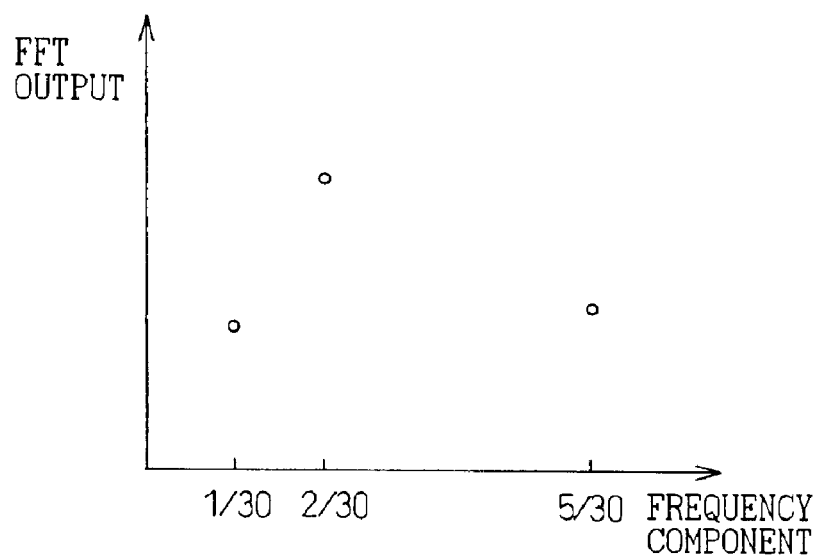
FIG. 6 is a diagram illustrating an example of outputs of the Fast Fourier Transformer unit.

FIG. 6 is a diagram illustrating an example of outputs of the Fast Fourier Transform unit FFT, wherein the abscissa represents the frequency component of when the reference signals or the signals to be measured are input to the FFT 55 or to the FFT 56 of FIG. 5, and the ordinate represents the FFT outputs.

A divider 57 picks up a fifth component $FFT_0$ in the signal recorded in, and reproduced from, the medium relying on the output of the FFT 55, picks up a fifth component $FFT_I$ in the signal recorded in, and reproduced from, the medium relying on the output of the FFT 56, and a calculates value of division $FFT_0/FFT_i$. NLTS measuring means 58 is formed of, for example, firmware. A nonlinear NLTS is calculated in compliance with the above-mentioned formula (1) by using a calculated result of the divider 57, and the thus calculated result is sent to a control circuit 59.

In the measurement of non-linearity shown in FIG. 5, non-linearity occurs in the transmission system between the pattern generator 51 and the recording means 52, between the recording means 52 and the medium 53, between the medium 53 and the reproducing means 54, and between the reproducing means 54 and the FFT 55. Non-linearly, however, doe not occur in the transmission system between the pattern generator 51 and the FFT 56. The $FFT_0$ and $FFT_I$, however, have the same particular frequency (fifth component), and there occurs no error in the frequency characteristics. As a result, the non-linearity can be measured without affected by the frequency characteristics of the transmission system.

FIGS. 7A and 7B show a table listing various recording patterns of the reference signals and of the to-be-measured signals used in the measurement of NLTS by the fifth harmonic method. In FIGS. 7A and 7B, the upper stage shows the items of the columns in which, from the left, the first column includes the kinds of measurement of NLTS, the second column includes the recording patterns, the third column includes the NLTSs, and the fourth column includes absolute errors due to asymmetry.

In FIGS. 7A and 7B, the first column from the left includes the kinds of NLTS measurement, such as bipolarities of the to-be-measured pattern Dibit ( - - - 00110000 - - - ), Tribit ( - - - 00111000 - - - ) and 2T ( - - - 00101000 - - - ), monopolarity of HTS ( - - - 1010 - - - ) and reference measuring pattern Ref ( - - - 10001000 - - - ).

In FIGS. 7A and 7B, the second column from the left includes the reference patterns and the to-be-measured patterns expressed by the NRZI notation. The data selected from these patterns are repetitively fed as record data every after 30 T to the control circuit 16 from the external unit.

In FIGS. 7A and 7B, the third column from the left includes NLTSs which are, successively from the upper side, average bipolar NLTS values of the to-be-measured pattern Dibit, Tribit and 2T and a unipolar NLTS of the to-be-measured pattern HTS.

In FIGS. 7A and 7B, the fourth column from the left includes absolute errors due to asymmetry. The errors can be calculated from an induced voltage detected as a signal of record data reproduced by the magnetic head 3.

$$Er=(Vp^+-VP^-)/2*(Vp^++VP^-) \qquad (3)$$

where Er is an error, $Vp^+$ is an absolute peak value of the positive induced voltage, and Vp– is an absolute peak value of the negative induced voltage.

FIGS. 8A and 8B show a table listing formulas for calculating the NLTS by the fifth harmonic method shown in FIGS. 7A and 7B. In FIGS. 8A and 8B, the upper stage shows the items of the columns in which a first column from the left includes the kinds of NLTS measurement, the second column includes the fifth harmonic components V5pat of the to-be-measured signals, the third column includes the fifth harmonic components V5ref of the reference signals, the fourth column includes the ratios Vab of the fifth harmonic components, and the fifth column include strict solutions and approximate solutions of the formulas for calculating the NLTS.

In FIGS. 8A and 8B, the first column from the left includes bipolarities of the kinds of the NLTS measurement such as Dibit, Tribit, 2T, and unipolarity of an HTS. In FIGS. 8A and 8B, nlts denotes the NLTS of when the preceding bit is being recorded or reproduced, and ow denotes the NLTS of data written before recording. The measurable NLTS in the continuation of magnetic inversion is the NLTS of the second bit in the case of the Dibit, is the NLTS of the third bit in the case of the Tribit, and is the NLTS that occurs at a frequency one-half that of the Dibit in the case of the 2T.

Formulas for calculating various NLTSs by the fifth harmonic method will now be described in detail.

1. Dibit NLTS (bipolarity): 30T

○ Calculation of the fifth component of a pattern A.

Positions of inversion of magnetization of the pattern A: [0, 1, 8, 15, 16, 23]

The NLTS by the preceding bit normalized with a bit period T is denoted by tn, and the NLTS by the previously recorded data that is normalized is denoted by tow.

$$Va(t) = h(t) - h(t - T - Ttow + Ttn) +$$
$$h(t - 8T) - h(t - 15T - Ttow) +$$
$$h(t - 16T + Ttn) - h(t - 23T - Ttow)$$

$$Va(f) = H(f)[\exp(0) - \exp(-j\omega T(1 + tow - tn)) +$$
$$\exp(-j\omega T(8)) - \exp(-j\omega T(15 + tow)) +$$
$$\exp(-j\omega T(16 - tn)) -$$
$$\exp(-j\omega T(23 + tow))]$$

Since the fifth component is $$5f0=5/T0=5/(30T)=1/(6T)$$
$$\omega T=2\pi fT=2\pi 5f0T=3/\pi$$

where f0 is a recurring reference frequency.

Therefore, the fifth component Va(5f0) of Va(f) is given by the following formula, $$Va(5f0) = H(f)[1 - \exp(-j\pi/3(1 + tow - tn)) + \qquad (1\text{-}1)$$
$$\exp(-j\pi/3*8) -$$
$$\exp(-j\pi/3(15 + tow)) +$$
$$\exp(-j\pi/3(16 - tn)) -$$
$$\exp(-j\pi/3(23 + tow))]$$
$$= H(f)[1 - \exp(-j\pi/3(1 + tow - tn)) +$$
$$\exp(-j\pi/3*2) + \exp(-j\pi/3*tow) -$$
$$\exp(-j\pi/3(1 - tn)) +$$
$$\exp(-j\pi/3(2 + tow))]$$
$$= H(f)[1 + \exp(-j\pi/3*tow) -$$
$$\exp(-j\pi/3(1 - tn))*$$
$$(1 + \exp(-j\pi/3*tow)) +$$
$$\exp(-j\pi/3*2)*$$
$$(1 + \exp(-j\pi/3*tow))]$$
$$= H(f)[(1 + \exp(-j\pi/3*tow))*$$
$$(1 + \exp(-j\pi/3*2) -$$
$$\exp(-j\pi/3(1 - tn)))]$$
$$= H(f)[1 + \exp(-j\pi/3*tow))*$$
$$(\exp(-j\pi/3) - \exp(-j\pi/3(1 - tn)))]$$

○ Similarly, a fifth component Vb(5f0) of a pattern B is found.

Positions of inversion of magnetization of the pattern B: [0, 15]

$$Vb(5f0) = H(f)[\exp(-j\pi/3(0)) - \qquad (1\text{-}2)$$
$$\exp(-j\pi/3(15 + tow))]$$
$$= H(f)[1 + \exp(-j\pi/3*tow)]$$

○ Deriving the formula for calculating NLTS.

First, Vab=Va(5f0)/Vb(5f0) is calculated. Here, Va(5f0) and Vb(5f0) are the absolute values since they are measured by using the spectrum analyzer. From the formulas (1-1) and (1-2), therefore, Vab is given by, $$Vab = |Va(5f0)/Vb(5f0)|$$
$$= |\exp(-j\pi/3) - \exp(-j\pi/3(1 - tn))|$$
$$= |\exp(-j\pi/3)(1 - \exp(+j\pi/3*tn))|$$
$$= |1 - \exp(+j\pi/3*tn)|$$

Here, if the real number part of exp(+jπ/3×tn) is denoted by Re(x) and an imaginary number part by Im(x), then, $$Vab = ((1 - Re(x))^2 + Im(x)^2)^{1/2}$$
$$= (1 + Re(x)^2 + Im(x)^2 - 2Re(x))^{1/2}$$

The real number part Re(x) is, $$Re(x)=(2-Vab^2)/2$$

Hence, the phase angle φ is, $$\phi=a\ cos(Re(x))=a\ cos((2-Vab^2)/2)$$

When viewed using the fifth component of f0, T is π/3 and, hence, the amount of NLTS for 1T is calculated in compliance with the following formula, $$NLTS = \phi * 3/\pi \quad (1\text{-}3)$$
$$= a\cos((2 - Vab^2)/2) * 3/\pi$$

2. Tribit NLTS (bipolar): 30T
○ Calculation of the fifth component of the pattern A.
Positions of inversion of magnetization of the pattern A:
[0, 1, 2, 6, 7, 9, 12, 15, 16, 17, 21, 22]
Similarly to calculating the Dibit NLTS, $$Va(5f0) = H(f)[1 - \exp(-j\pi/3(1 - tn1 + tow)) + \quad (2\text{-}1)$$
$$\exp(-j\pi/3(2 - tn2)) -$$
$$\exp(-j\pi/3(6 + tow)) +$$
$$\exp(-j\pi/3(7 - tn1)) -$$
$$\exp(-j\pi/3(9 + tow)) +$$
$$\exp(-j\pi/3(12)) -$$
$$\exp(-j\pi/3(15 + tow)) +$$
$$\exp(-j\pi/3(16 - tn1)) -$$
$$\exp(-j\pi/3(17 - tn2 + tow)) +$$
$$\exp(-j\pi/3(21)) -$$
$$\exp(-j\pi/3(22 - tn1 + tow))]$$
$$= H(f)[1 - \exp(-j\pi/3(1 - tn1 + tow)) +$$
$$\exp(-j\pi/3(2 - tn2)) -$$
$$\exp(-j\pi/3 * tow) +$$
$$\exp(-j\pi/3(1 - tn1)) +$$
$$\exp(-j\pi/3 * tow) + 1 +$$
$$\exp(-j\pi/3 * tow) -$$
$$\exp(-j\pi/3(1 - tn1)) +$$
$$\exp(-j\pi/3(2 - tn2 + tow)) -$$
$$1 + \exp(-j\pi/3(1 - tn1 + tow))]$$
$$= H(f)[1 + \exp(-j\pi/3 * tow) +$$
$$\exp(-j\pi/3(2 - tn2)) +$$
$$\exp(-j\pi/3(1 - tn2 + tow))]$$
$$= H(f)[(1 + \exp(-j\pi/3 * tow))$$
$$(1 + \exp(-j\pi/3(2 - tn2)))]$$

The pattern B for deriving the formula for calculating the NLTS is the same as that of the case of the Dibit NLTS. From the formulas (1-2) and (2-1), therefore, Vab is given by, $$Vab = |1 + \exp(-j\pi/3(2 - tn2))|$$

Like in the case of the Dibit NLTS, Re(x) is found to be, $$Re(x) = (Vab^2 - 2)/2$$

The NLTS is calculated in accordance with the following formula since Vab is based on −2π/3 which is the third quadrant and since the calculated result of acos(x) is 0 to π, i.e., $$NLTS = (2\pi/3 - a\cos((Vab^2 - 2)/2)) * 3/\pi \quad (2\text{-}2)$$
$$= 2 - a\cos((vab^2 - 2)/2) * 3/\pi$$

3. O/W NLTS=HTS: Fifth Harmonic Method: 30T
○ Calculating the fifth component of the pattern A.
Positions of inversion of magnetization of the pattern A:
[0, 2, 4, 6, 8, 12, 14, 16, 18, 20]
Like when calculating the Dibit NLTS, $$Va(5f0) = H(f)[1 - \exp(-j\pi/3(2 + tow)) + \quad (3\text{-}1)$$
$$\exp(-j\pi/3(4)) - \exp(-j\pi/3(6 + tow)) +$$
$$\exp(-j\pi/3(8)) -$$
$$\exp(-j\pi/3(12 + tow)) +$$
$$\exp(-j\pi/3(14)) -$$
$$\exp(-j\pi/3(16 + tow)) +$$
$$\exp(-j\pi/3(18)) -$$
$$\exp(-j\pi/3(20 + tow))]$$
$$= H(f)[1 - \exp(-j\pi/3(2 + tow)) +$$
$$\exp(-j\pi/3) - \exp(-j\pi/3 * tow) +$$
$$\exp(-j\pi/3(2)) - \exp(-j\pi/3 * tow) +$$
$$\exp(-j\pi/3 * 2) +$$
$$\exp(-j\pi/3(1 + tow)) + 1 -$$
$$\exp(-j\pi/3(2 + tow))]$$
$$= H(f)[2 - 2\exp(-j\pi/3(2 + tow)) +$$
$$2\exp(-j\pi/3 * 2) - 2\exp(-j\pi/3 * tow) +$$
$$\exp(-j\pi/3(1 + tow)) - \exp(-j\pi/3)]$$
$$= H(f)[(1 - \exp(-j\pi/3 * tow))\exp(-j\pi/3)]$$

○ Deriving the formula for calculating the NLTS.
The pattern B is the same as in the case of the Dibit NLTS. From the formulas (1-2) and (3-1), therefore, Vab is given by, $$Vab = |(1 - \exp(-j\pi/3 * tow))\exp(-j\pi/3)| /$$
$$|1 + \exp(-j\pi/3 * tow)|$$
$$= |1 - \exp(-j\pi/3 * tow)| /$$
$$|1 + \exp(-j\pi/3 * tow)|$$

Re(x) is found in the same manner as in the case of the Dibit NLTS.

$$Vab^2 = [(1 - Re(x))^2 + Im(x)^2] /$$
$$[(1 + Re(x))^2 + Im(x)^2]$$
$$= (1 - Re(x))/(1 + Re(x))$$

$$\therefore Re(x) = (1 - Vab^2)/(1 + Vab^2)$$

Therefore, NLTS is calculated according to the following formula, $$NLTS = a\cos((1 - Vab^2)/(1 + Vab^2)) * 3/\pi \quad (3\text{-}2)$$

4. 2T NLTS: 30T

○ Calculating the fifth component of the pattern A.

Positions of inversion of magnetization of the pattern A: [0, 2, 8, 15, 17, 23]

Like when calculating the above Dibit NLTS, $$Va(5f0) = H(f)[1 - \exp(-j\pi/3(2 - tn + tow)) + \quad (4\text{-}1)$$
$$\exp(-j\pi/3*8) -$$
$$\exp(-j\pi/3(15 + tow)) +$$
$$\exp(-j\pi/3(17 - tn)) -$$
$$\exp(-j\pi/3(23 + tow))]$$
$$= H(f)[1 - \exp(-j\pi/3(2 - tn + tow)) +$$
$$\exp(-j\pi/3*2) + \exp(-j\pi/3*tow) -$$
$$\exp(-j\pi/3(2 - tn)) +$$
$$\exp(-j\pi/3(2 + tow))]$$
$$= H(f)[(1 + \exp(-j\pi/3*tow))\exp(-j\pi/3) -$$
$$\exp(-j\pi/3(2 - tn)))$$
$$= H(f)[(1 + \exp(-j\pi/3*tow))\exp(-j\pi/3)$$
$$(1 - \exp(-j\pi/3(1 - tn))))]$$

○ Deriving the formula for calculating the NLTS.

Since the pattern B is the same as in the case of the Dibit NLTS, Vab is calculated from the formulas (1-2) and (4-1) to be, $$Vab = |\exp(-j\pi/3)(1 - \exp(-j\pi/3(1 - tn))|$$
$$= |(1 - \exp(-j\pi/3(1 - tn)))|$$

Re(x) is found in the same manner as in the case of the Dibit NLTS.

$$Vab^2 = (1-Re(x))^2 + Im(x)^2$$
$$\therefore Re(x) = (2-Vab^2)/2$$

Therefore, the NLTS is calculated in accordance with the following formula, $$NLTS = 1 - a\ \cos((2-Vab^2)/2)*3/\pi \quad (4\text{-}2)$$

5. O/W NLTS (Hard Transition Shift) by the O/W Method.

○ Fundamental frequency component VF2 of the reference pattern: period 4T

Position of inversion of magnetization of the pattern A: [0, 2]

$$VF2(t) = x(0) - x(2T + Ttow)$$

A period (1/f0) of VF2(t) corresponds to 4T and, hence, ωT=2πf0.

Similarly to calculating the above Dibit NLTS, $$Va(5f0) = H(f)[1 - \exp(-j\pi/3(2 - tn + tow)) + \quad (5\text{-}1)$$
$$\exp(-j\pi/3*8) -$$
$$\exp(-j\pi/3(15 + tow)) +$$
$$\exp(-j\pi/3(17 - tn)) -$$
$$\exp(-j\pi/3(23 + tow))]$$
$$= H(f)[1 - \exp(-j\pi/3(2 - tn + tow)) +$$
$$\exp(-j\pi/3*2) + \exp(-j\pi/3*tow) -$$
$$\exp(-j\pi/3(2 - tn)) +$$
$$\exp(-j\pi/3(2 + tow))]$$
$$= H(f)[(1 + \exp(-j\pi/3*tow))(\exp(-j\pi/3) -$$
$$\exp(-j\pi/3(2 - tn)))]$$
$$= H(f)[(1 + \exp(-j\pi/3*tow))(\exp(-j\pi/3)$$
$$(1 - \exp(-j\pi/3(1 - tn))))]$$

○ Deriving the formula for calculating the NLTS.

Since the pattern B is the same as in the case of the Dibit NLTS, Vab is calculated from the formulas (1-2) and (4-1) to be, $$Vab = |\exp(-j\pi/3)(1 - \exp(-j\pi/3(1 - tn))|$$
$$= |(1 - \exp(-j\pi/3(1 - tn)))|$$

Re(x) is found in the same manner as in the case of the Dibit NLTS.

$$Vab^2 = (1-Re(x))^2 + Im(x)^2$$
$$\therefore Re(x) = (2-Vab^2)/2$$

Therefore, the NLTS (HTS) is calculated in accordance with the following formula, $$NLTS = 1 - a\ \cos((2-Vab^2)/2)*3/\pi \quad (5\text{-}2)$$

Figure 10:
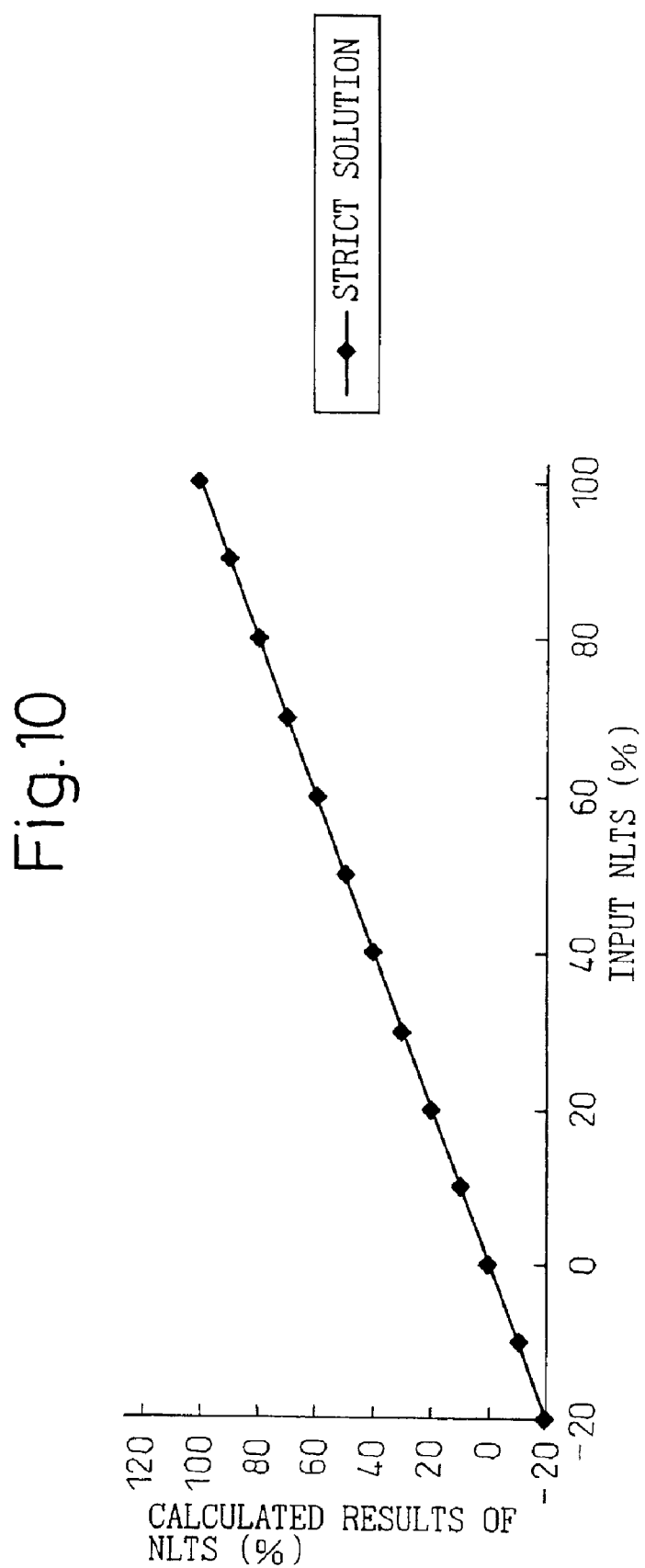
FIG. 10 is a diagram illustrating the results of calculating the NLTSs in simulating various NLTSs in a linear reproducing transmission line by using a Tribit pattern as the to-be-measured signals according to the present invention.

FIG. 9 is a diagram illustrating the results of calculating the NLTSs in simulating various NLTSs in a linear reproducing transmission line according to a prior art, and FIGS. 10 to 12 are diagrams illustrating the results of calculating the NLTSs in simulating various NLTSs in a linear reproducing transmission line according to the present invention, FIG. 9 illustrating the results of calculating the NLTSs by using the Dibit pattern as the to-be-measured signals, FIG. 10 illustrating the results of calculating the NLTSs by using the Tribit pattern as the to-be-measured signals, FIG. 11 illustrating the results of calculating the NLTSs by using the 2T pattern as the to-be-measured signals, and FIG. 12 illustrating the results of calculating the NLTSs by using the HTS (O/w NLTS) pattern as the to-be-measured signals.

Figure 14A:
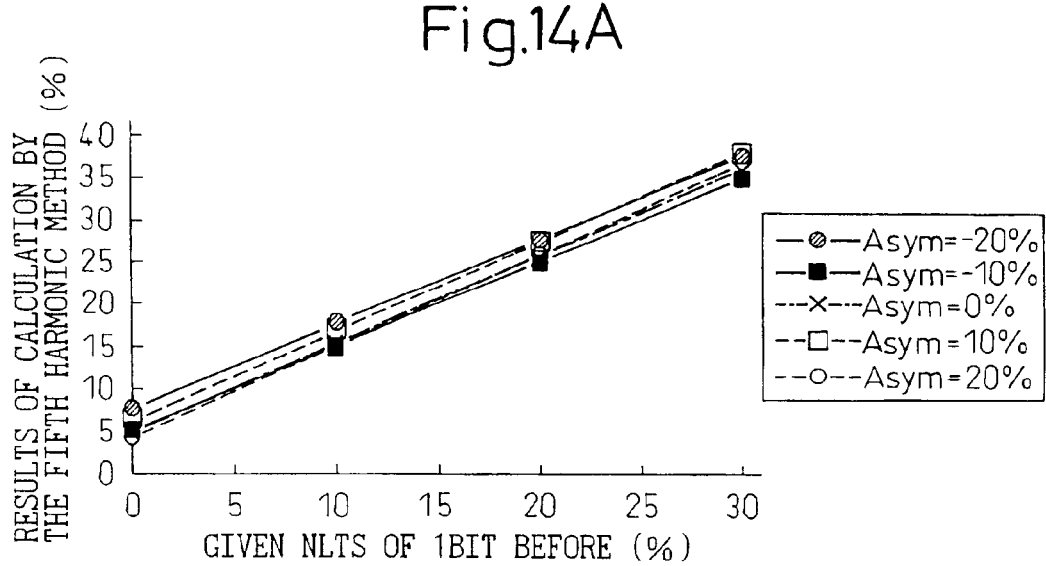
FIG. 14A is a diagram illustrating the results of measuring the NLTSs by the fifth harmonic method while changing the NLTS by the record data of one bit before from 0% to 30%.
Figure 14B:
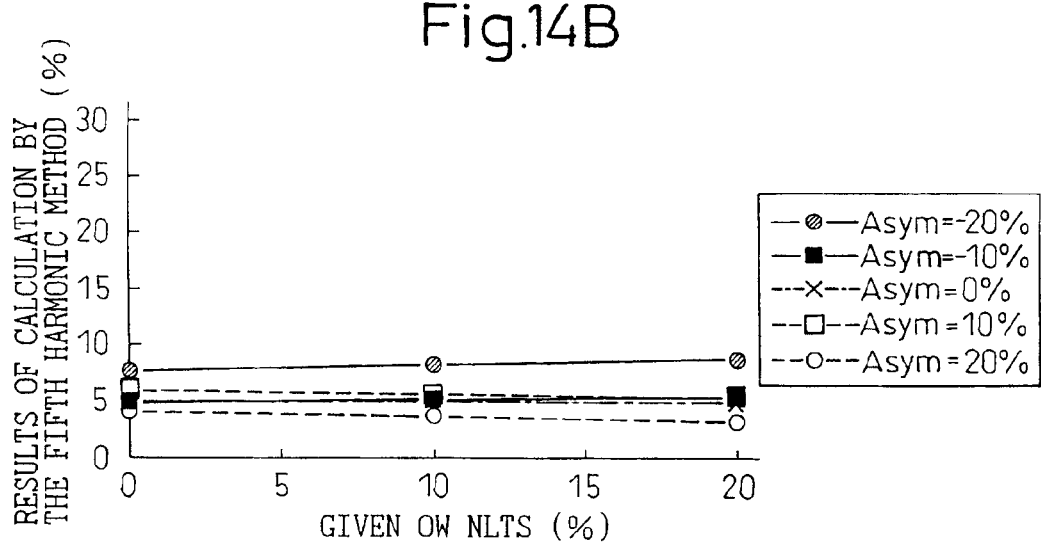
FIG. 14B is a diagram illustrating the results of measuring the NLTSs by the fifth harmonic method while fixing the NLTS by the record data of one bit before to 0% in FIG. 14A.
Figure 15A:
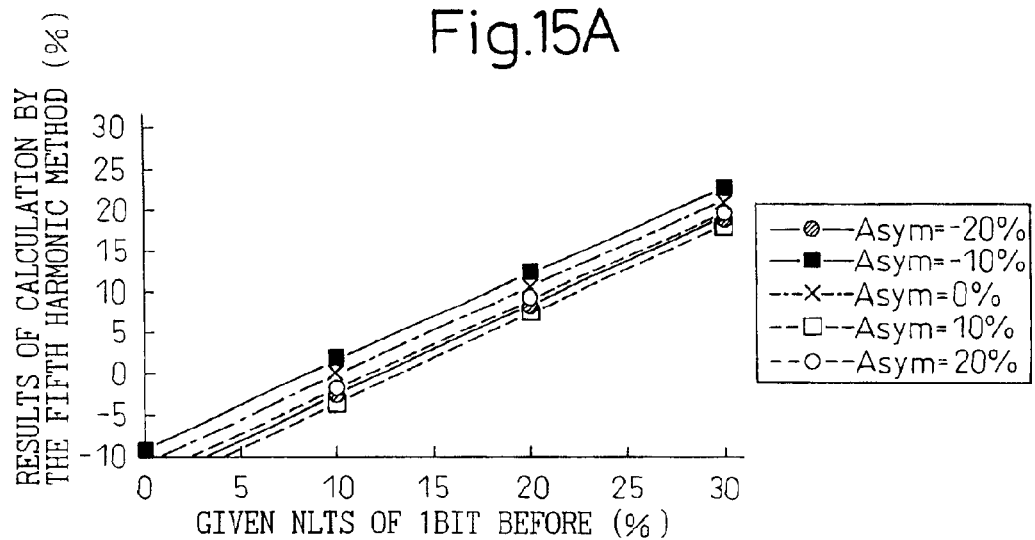
FIG. 15A is a diagram illustrating the results of measuring the NLTSs by the fifth harmonic method while changing the NLTS by the record data of one bit before from 0% to 30%.
Figure 15B:
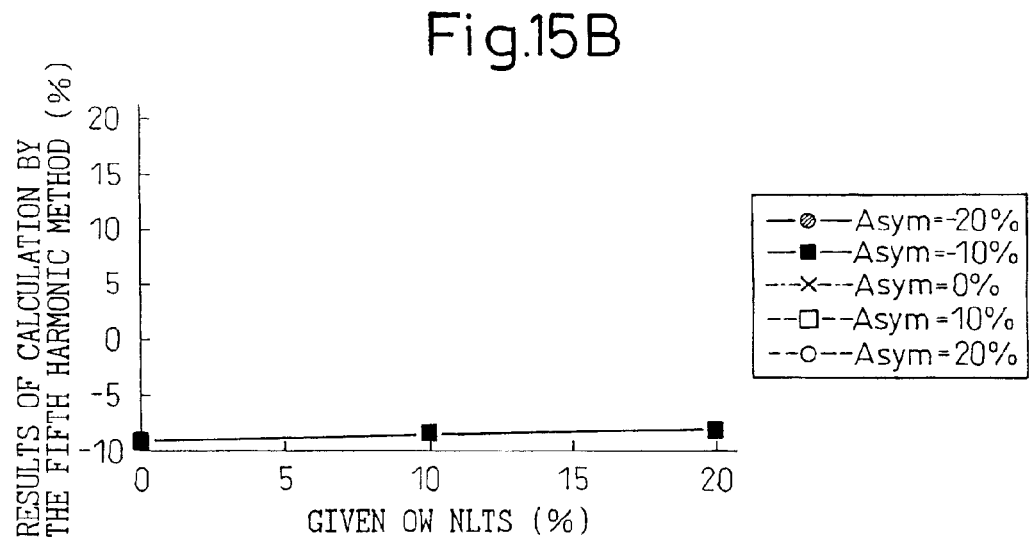
FIG. 15B is a diagram illustrating the results of measuring the NLTSs by the fifth harmonic method while fixing the NLTS by the record data of one bit before to 0% in FIG. 15A.

FIGS. 13 to 15 are diagrams illustrating the results of calculating the NLTSs in simulating various NLTSs in a non-linear reproducing transmission line, and correspond to FIGS. 9 to 12, respectively, FIG. 13 illustrating the results of calculating the NLTSs by using the Dibit pattern as the to-be-measured signals, FIG. 14 illustrating the results of calculating the NLTSs by using the Tribit pattern as the to-be-measured signals, FIG. 15 illustrating the results of calculating the NLTSs by using the 2T pattern as the to-be-measured signals, and FIG. 16 illustrating the results of calculating the NLTSs by using the HTS (O/W NLTS) pattern as the to-be-measured signals. FIGS. 13A, 14A, 15A and 16A are diagrams illustrating the results of measuring the NLTSs by the fifth harmonic method while changing the NLTS by the record data of one bit before from 0% to 30%. FIGS. 13B, 14B, 15B and 16B are diagrams illustrating the results of measuring the NLTSs by the fifth harmonic method while fixing the NLTS by the record data of one bit before to 0% in FIGS. 13A, 14A, 15A and 16A.

According to the present invention as described above, the measuring method can be carried out relying only upon the harmonics method irrespective of the kind of NLTS and, besides, the reference signals can be used in common. Accordingly, a variety kinds of NLTSs can be accomplished by simply changing the pattern to be measured and the formula for calculation.

In addition, according to the present invention, various NLTSs can be measured even in a system in which MR non-linearity exists and the NLTSs can be easily modeled in the head medium system and the write precompensation circuit (WPC) can be optimized in a form which assures reliable measurement. The WPC can be optimized by using a value of ratio Vab of the fifth components of the reference signals and of the to-be-measured signals without the need of calculating the NLTSs using the formulas. In the Tribit pattern NLTS and 2T pattern NLTS, for example, the NLTSs become the smallest as Vab approaches 1.

According to the present invention, further, the NLTS can be measured involving a measuring error of about 5% even by taking the non-linearity of the MR-type reproduction head into consideration.

Furthermore, according to the present invention, a device for magnetic recording/reproduction is capable of measuring the NLTS by itself.

What is claimed is:

1. A method of measuring non-linearity in the magnetic recording/reproduction of a medium comprising the steps of:
   measuring a first predetermined harmonic component from the reproduced signals of the reference signals magnetically recorded in a medium;
   measuring a second predetermined harmonic component from the reproduced signals for each of the plural kinds of to-be-measured signals magnetically recorded in said medium; and
   calculating a non-linear transition shift NLTS in the magnetic recording/reproduction from said first predetermined harmonic component and from said second predetermined harmonic component corresponding to each of the to-be-measured signals,
   wherein said harmonic component of said first and second predetermined harmonic components is a fifth harmonic component,
   wherein said reference signals are the ones obtained by cyclically and serially shifting, from an optional bit, the data of a bit-string pattern for magnetically recording the data into said medium by once effecting the magnetization and demagnetization for the same period of time, respectively; and wherein
   said plural kinds of predetermined bit-string patterns include:
   a first pattern of bit strings each including a tribit in which the magnetic inversion occurs continuously for three bits in each period of said magnetization and demagnetization;
   a second pattern of bit strings each including 2T in which the magnetic inversion occurs after an interval of two bits in each period of said magnetization and demagnetization; and
   a third pattern of bit strings including a bit constitution HTS in which the magnetic inversion occurs in a manner that the magnetization occurs in a direction opposite to the direction of magnetization of the record in the medium.

2. A measuring method according to claim 1 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

3. A measuring method according to claim 1 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

4. A measuring method according to claim 1 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

5. A method of measuring non-linearity in the magnetic recording/reproduction of a medium comprising the steps of:
   measuring a first predetermined harmonic component from the reproduced signals of the reference signals magnetically recorded in a medium;
   measuring a second predetermined harmonic component from the reproduced signals for each of the plural kinds of to-be-measured signals magnetically recorded in said medium; and
   calculating a non-linear transition shift NLTS in the magnetic recording/reproduction from said first predetermined harmonic component and from said second predetermined harmonic component corresponding to each of the to-be-measured signals,
   wherein said NLTS is measured within an error range of 5%.

6. A measuring method according to claim 5 above, wherein said harmonic component of said first and second harmonic components is a fifth harmonic component.

7. A measuring method according to claim 6 above, wherein said reference signals are the ones obtained by cyclically and serially shifting, from an optional bit, the data of a bit-string pattern for magnetically recording the data into said medium by once effecting the magnetization and demagnetization for the same period of time, respectively; and wherein
   said plural kinds of predetermined bit-string patterns include:
   a first pattern of bit strings each including a tribit in which the magnetic inversion occurs continuously for three bits in each period of said magnetization and demagnetization;
   a second pattern of bit strings each including 2T in which the magnetic inversion occurs after an interval of two bits in each period of said magnetization and demagnetization; and a third pattern of bit strings including a bit constitution HTS in which the magnetic inversion occurs in a manner that the magnetization occurs in a direction opposite to the direction of magnetization of the record in the medium.

8. A measuring method according to claim 7 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

9. A measuring method according to claim 7 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

10. A measuring method according to claim 7 above, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

11. An large scale integration (LSI) for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there is incorporated a circuit for generating a bit-string pattern in common with said plural kinds of bit-string patterns and plural kinds of predetermined bit-string patterns forming said to-be-measured signals, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

12. An LSI for magnetic recording/reproduction according to claim 11 above, wherein said LSI for magnetic recording/reproduction includes a circuit for measuring the fifth harmonic component from the reproduced signals of the data read from said medium in which the data have been stored using said reference signals or said to-be-measured signals.

13. An LSI for magnetic recording/reproduction according to claim 12 above, wherein said LSI for magnetic recording/reproduction includes a circuit for calculating a ratio Vab (=V5pat/V5ref) of a second fifth harmonic component V5pat which is a reproduced signal of the data read from said medium in which the data have been recorded using said to-be-measured signals to a first fifth harmonic component V5ref which is a reproduced signal of the data from said medium in which the data have been recorded by using said reference signals.

14. An LSI for magnetic recording/reproduction according to claim 13 above, wherein said LSI for magnetic recording/reproduction includes a circuit for calculating a non-linear transition shift NLTS in the magnetic recording/reproduction based upon said ratio Vab (=V5pat/V5ref) calculated from said first fifth harmonic component V5ref and said second fifth harmonic component V5pat.

15. An LSI for magnetic recording/reproduction according to any one of claim 12, 13 or 14, wherein said circuit for measuring the fifth harmonic component includes a high-speed Fourier transform circuit.

16. An LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there is incorporated a circuit for generating a bit-string pattern in common with said plural kinds of bit-string patterns and plural kinds of predetermined bit-string patterns forming said to-be-measured signals, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

17. An LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there is incorporated a circuit for generating a bit-string pattern in common with said plural kinds of bit-string patterns and plural kinds of predetermined bit-string patterns forming said to-be-measured signals, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

18. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for selecting data of a bit-string pattern from the data of a bit-string pattern in common with said plural kinds of bit-string patterns and of plural kinds of predetermined bit-string patterns forming said to-be-measured signals, and means for generating said reference signals or said to-be-measured signals by cyclically and serially shifting the data of said selected bit-string pattern starting from any bit, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

19. A device for magnetic recording/reproduction according to claim 18 above, wherein said LSI for magnetic recording/reproduction includes a circuit for measuring the fifth harmonic component from the reproduced signals of the data read from said medium in which the data have been stored using said reference signals or said to-be-measured signals.

20. A device for magnetic recording/reproduction according to claim 19 above, wherein said LSI for magnetic recording/reproduction includes a circuit for calculating a ratio Vab (=V5pat/V5ref) of a second fifth harmonic component V5pat which is a reproduced signal of the data read from said medium in which the data have been recorded using said to-be-measured signals to a first fifth harmonic component V5ref which is a reproduced signal of the data from said medium in which the data have been recorded by using said reference signals.

21. A device for magnetic recording/reproduction according to claim 19 above, wherein said LSI for magnetic recording/reproduction includes a circuit for calculating a non-linear transition shift NLTS in the magnetic recording/reproduction based upon said ratio Vab (=V5pat/V5ref) calculated from said first fifth harmonic component V5ref and said second fifth harmonic component V5pat.

22. A device for magnetic recording/reproduction according to any one of claims 19, 20 and 21, wherein said means for measuring the fifth harmonic component includes a Fast Fourier Transform unit.

23. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for selecting data of a bit-string pattern from the data of a bit-string pattern in common with said plural kinds of bit-string patterns and of plural kinds of predetermined bit-string patterns forming said to-be-measured signals, and means for generating said reference signals or said to-be-measured signals by cyclically and serially shifting the data of said selected bit-string pattern starting from any bit, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

24. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for selecting data of a bit-string pattern from the data of a bit-string pattern in common with said plural kinds of bit-string patterns and of plural kinds of predetermined bit-string patterns forming said to-be-measured signals, and means for generating said reference signals or said to-be-measured signals by cyclically and serially shifting the data of said selected bit-string pattern starting from any bit, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

25. An LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there are incorporated a circuit for generating a bit-string pattern forming said reference signals and a predetermined bit-string pattern forming said to-be-measured signals, and a circuit for measuring a predetermined harmonic component from said reference signals recorded in said medium and from the reproduced signals said to-be-measured signals, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

26. An LSI for magnetic recording/reproduction according to any one of claim 11, 12, 13, 14 or 25, wherein said LSI for magnetic recording/reproduction includes a circuit for adjusting a write compensation circuit based upon said fifth harmonic component.

27. A device for magnetic recording/reproduction mounting an LSI for magnetic recording/reproduction of any one of claim 11, 12, 13, 14 or 25.

28. An LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there are incorporated a circuit for generating a bit-string pattern forming said reference signals and a predetermined bit-string pattern forming said to-be-measured signals, and a circuit for measuring a predetermined harmonic component from said reference signals recorded in said medium and from the reproduced signals said to-be-measured signals, wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

29. An LSI for magnetic recording/reproduction which generates reference signals that are to be magnetically recorded into a medium, measures a first predetermined harmonic component from the reproduced signals thereof, generates to-be-measured signals corresponding to said reference signals that are to be magnetically recorded into said medium, and measures a second predetermined harmonic component from the reproduced signals thereof, wherein there are incorporated a circuit for generating a bit-string pattern forming said reference signals and a predetermined bit-string pattern forming said to-be-measured signals, and a circuit for measuring a predetermined harmonic component from said reference signals recorded in said medium and from the reproduced signals said to-be-measured signals wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

30. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for generating said reference signals or said to-be-measured signals by selecting data of a bit-string pattern from the data of the bit-string pattern forming said reference signals and of a predetermined bit-string pattern forming said to-be-measured signals, and cyclically and serially shifting the data of said selected bit-string pattern starting from any bit, and means for measuring a predetermined harmonic component from the reproduced signals of the data read from said medium in which the data have been recorded by using said reference signals and said to-be-measured signals recorded in said medium, and wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said first pattern is a 30-bit string of 111000110100100 111000110000000 in which the magnetic inversion occurs at the 0th, 1st, 2nd, 6th, 7th, 9th, 12th, 15th, 17th and 21st bits and at the 22nd bit.

31. A device for magnetic recording/reproduction according to any one of claim 18, 19, 20, 21 or 30, wherein said device for magnetic recording/reproduction includes means for adjusting a write compensation circuit based upon said fifth harmonic component.

32. A device for magnetic recording/reproduction according to any one of claim 18, 19, 20, 21 or 30, wherein said device for magnetic recording/reproduction includes a magnetic reluctance-type head for detecting said reproduced signals.

33. A device for magnetic recording/reproduction according to any one of claim 18, 19, 20, 21 or 30, wherein said NLTS is measured within an error range of 5%.

34. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for generating said reference signals or said to-be-measured signals by selecting data of a bit-string pattern from the data of the bit-string pattern forming said reference signals and of a predetermined bit-string pattern forming said to-be-measured signals, and cyclically and serially shifting the data of said selected bit-string pattern starting from any bit, and means for measuring a predetermined harmonic component from the reproduced signals of the data read from said medium in which the data have been recorded by using said reference signals and said to-be-measured signals recorded in said medium, and wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said second pattern is a 30-bit string of 101000001000000 101000001000000 in which the magnetic inversion occurs at the 0th, 2nd, 8th, 15th and 17th bits and at the 23rd bit.

35. A device for magnetic recording/reproduction for measuring the non-linearity in the magnetic recording/reproduction of a medium by generating reference signals that are to be magnetically recorded into a medium, measuring a first predetermined harmonic component from the reproduced signals thereof, generating to-be-measured signals corresponding to said reference signals that are to be magnetically recorded into said medium, measuring a second predetermined harmonic component from the reproduced signals thereof, and calculating a non-linear transition shift NLTS in said magnetic recording/reproduction from said first predetermined harmonic component and said second predetermined harmonic component, wherein there are provided means for generating said reference signals or said to-be-measured signals by selecting data of a bit-string pattern from the data of the bit-string pattern forming said reference signals and of a predetermined bit-string pattern forming said to-be-measured signals, and cyclically and serially shifting the data of said selected bit-string pattern starting from any bit, and means for measuring a predetermined harmonic component from the reproduced signals of the data read from said medium in which the data have been recorded by using said reference signals and said to-be-measured signals recorded in said medium, and wherein, when a bit that undergoes the magnetic inversion is denoted by 1, said reference signals are those signals repeating a pattern of a 30-bit string of 100000000000000 100000000000000 in which the magnetic inversion occurs at the 0th bit and at the 15th bit, and said third pattern is a 30-bit string of 101010101000101 010101000000000 in which the magnetic inversion occurs at the 0th, 2nd, 4th, 6th, 8th, 12th, 14th, 16th and 18th bits and at the 20th bit.

* * * * *